(12) United States Patent
Shi et al.

(10) Patent No.: US 11,204,038 B2
(45) Date of Patent: Dec. 21, 2021

(54) VACUUM PUMP, AND MAGNETIC BEARING DEVICE AND ANNULAR ELECTROMAGNET USED IN VACUUM PUMP

(71) Applicant: Edwards Japan Limited, Chiba (JP)

(72) Inventors: Yongwei Shi, Chiba (JP); Toom Miwata, Chiba (JP); Yoshiyuki Sakaguchi, Chiba (JP)

(73) Assignee: EDWARDS JAPAN LIMITED, Chiba (JP)

( * ) Notice: Subject to any disclaimer, the term of this patent is extended or adjusted under 35 U.S.C. 154(b) by 161 days.

(21) Appl. No.: 16/612,911

(22) PCT Filed: Apr. 20, 2018

(86) PCT No.: PCT/JP2018/016366
§ 371 (c)(1),
(2) Date: Nov. 12, 2019

(87) PCT Pub. No.: WO2018/211913
PCT Pub. Date: Nov. 22, 2018

(65) Prior Publication Data
US 2020/0166041 A1    May 28, 2020

(30) Foreign Application Priority Data
May 19, 2017 (JP) .............................. JP2017-099451

(51) Int. Cl.
*F04D 19/04* (2006.01)
*H02K 7/09* (2006.01)

(52) U.S. Cl.
CPC ............. *F04D 19/048* (2013.01); *H02K 7/09* (2013.01); *H02K 2203/12* (2013.01)

(58) Field of Classification Search
CPC .... F04D 19/048; F04D 19/042; F04D 29/058; F04D 19/04; H02K 7/09; H02K 2203/12;
(Continued)

(56) References Cited

U.S. PATENT DOCUMENTS 6,737,782 B2 * 5/2004 Suzuki .................. H02K 1/148
310/194
10,030,702 B2 * 7/2018 Bauce .................. F16C 32/047

FOREIGN PATENT DOCUMENTS

| EP | 3026278 A1 | 6/2016 |
| JP | H10327545 A | 12/1998 |

(Continued)

OTHER PUBLICATIONS

PCT International Search Report dated Jul. 17, 2018 for corresponding PCT Application No. PCT/JP2018/016366.
(Continued)

*Primary Examiner* — Tulsidas C Patel
*Assistant Examiner* — Riley Owen Stout
(74) *Attorney, Agent, or Firm* — Theodore M. Magee; Westman, Champlin & Koehler, P.A.

(57) ABSTRACT

Bobbins of an annular electromagnet each have a bobbin body that has a coil wire wound around an outer periphery thereof and is attached to a respective tooth of an annular stator core by having the corresponding tooth inserted therethrough. A first flange portion in a rectangular hallow shape is provided on an end surface of the bobbin body near the center of the annular stator core and a second flange portion in a rectangular hallow shape is provided on the other end surface of the bobbin body. A coil winding amount increasing means is formed at least on the first flange portion or the second flange portion and increases the amount of winding of the coil wire wound around the bobbin body.

6 Claims, 16 Drawing Sheets

(58) Field of Classification Search
CPC ...... H02K 11/22; H02K 11/225; H02K 11/27;
H02K 11/215; H02K 1/146; H02K
2213/03; H02K 7/14; H01F 7/20; H01F
5/02; H01F 7/06; F16C 32/0461; F16C
32/047; F16C 2360/00; F16C 32/04;
F16C 2360/44; F05D 2240/51
See application file for complete search history.

(56) References Cited

FOREIGN PATENT DOCUMENTS

| | | | | |
|---|---|---|---|---|
| JP | 2000069703 | A | | 3/2000 |
| JP | 2001008395 | A | * | 1/2001 |
| JP | 2001008395 | A | | 1/2001 |
| JP | 2004088944 | A | | 3/2004 |
| JP | 2006083923 | A | | 3/2006 |
| JP | 2008182823 | A | | 8/2008 |
| JP | 2013118749 | A | | 6/2013 |

OTHER PUBLICATIONS

PCT International Written Opinion dated Jul. 17, 2018 for corresponding PCT Application No. PCT/JP2018/016366.
Communication dated Jan. 26, 2021 and Supplementary European Search Report dated Jan. 18, 2021 for corresponding European application Serial No. 18802404.6.

* cited by examiner

VACUUM PUMP, AND MAGNETIC BEARING DEVICE AND ANNULAR ELECTROMAGNET USED IN VACUUM PUMP

CROSS-REFERENCE OF RELATED APPLICATION

This application is a Section 371 National Stage Application of International Application No. PCT/JP2018/016366, filed Apr. 20, 2018, which is incorporated by reference in its entirety and published as WO 2018/211913 A1 on Nov. 22, 2018 and which claims priority of Japanese Application No. 2017-099451, filed May 19, 2017.

BACKGROUND

The present invention relates to a vacuum pump, and a magnetic bearing device and an annular electromagnet used in the vacuum pump. Particularly, the present invention relates to a vacuum pump that is small and capable of improving the attractive force of an electromagnet, and a magnetic bearing device and an annular electromagnet used in the vacuum pump.

In a rotating machine or the like under a special environment such as a vacuum pump, a magnetic bearing device for supporting a rotating body in a non-contact manner is often used as a bearing device (see Japanese Patent Application Laid-open No. 2006-83923, for example).

The magnetic bearing device is typically configured to support the load of the rotating body in a non-contact manner by attracting a target provided on the rotating body by means of a plurality of electromagnets provided around the rotating body. Therefore, in a case where the electromagnets do not attract the target of the rotating body with appropriate attracting force (magnetic force), bearing accuracy may be lowered.

Japanese Patent Application Laid-open No. 2006-83923 discloses a structure in which a rotating body shaft is attached to the center of a rotor having rotor blades, and an annular electromagnet is disposed outside the rotor shaft in a radial direction thereof, thereby levitating and supporting the rotor shaft using the annular electromagnet.

A schematic structure of the magnetic bearing device of the prior art is explained using FIGS. 13 and 14. FIG. 13 is a diagram showing a horizontal cross section of a magnetic bearing device 100, viewed from above, in which a rotor shaft 102 is levitated and supported in the air by an annular electromagnet 101. FIG. 14 is an enlarged view of a part of FIG. 13.

The bearing device 100 illustrated in FIGS. 13 and 14 has a structure in which the annular electromagnet 101 is disposed in a non-contact manner and concentrically with the rotor shaft 102 on the radially outer side of the rotor shaft 102. The annular electromagnet 101 has a stator core 103 in an annular shape (referred to as "annular stator core 103" hereinafter) and a plurality of coil portions 104 attached to an inner peripheral wall 103a of the annular stator core 103. This bearing device 100 constitutes a magnetic bearing, and the rotor shaft 102 is configured to have only the degree of freedom of rotation around the axis.

The annular stator core 103 is provided with eight teeth 103b that protrude from the inner peripheral wall 103a toward a center O, with predetermined intervals in a circumferential direction, at a phase angle of, in the illustrated embodiment, 2a and 90°−2α. The cross-sectional shape of each tooth 103b is a rectangular shape. The coil portions 104 are attached to the teeth 103b respectively. Flat core bearing surfaces 103c for placing second flange portions 109 of bobbins 105 in close contact with the inner peripheral wall 103a are each provided in a base portion of each of the teeth 103b on which the respective coil portions 104 are mounted, that is, a part of the inner peripheral wall 103a of the annular stator core 103.

The coil portions 104 include, respectively, the bobbins 105 and coils 106 formed by winding coil wires 106a around respective outer peripheries of the bobbins 105 a predetermined number of times.

The bobbins 105 are each formed of an insulating material such as resin and each have a bobbin body 107, a first flange portion 108, and a second flange portion 109.

The bobbin body 107 has a rectangular insertion hole 110 through which the corresponding tooth 103b can be inserted, and is a cylindrical body penetrating in in a front-rear direction and having a rectangular cross-sectional shape. The coil wire 106a of the coil 106 is wound around an outer peripheral surface of the bobbin body 107 the predetermined number of times.

The first flange portion 108 is a rectangular flange portion having a rectangular hollow shape when viewed from the front, i.e., having a hole in the center thereof, and is provided on one end surface of the bobbin body 107 located near the center O of the annular stator core 103 so as to project from the outer peripheral surface of the bobbin body 107 to the outside at a substantially right angle.

The second flange portion 109 is a rectangular flange portion having a rectangular hollow shape when viewed from the front, i.e., having a hole in the center thereof as with the first flange portion 108, and is provided on an end surface of the bobbin body 107, opposite to the first flange portion 108, so as to project from the outer peripheral surface of the bobbin body 107 to the outside at a substantially right angle.

In each of the bobbins 105 formed as described above, after winding the coil wire 106a around the outer peripheral surface of the bobbin body 107 the predetermined number of times, the corresponding tooth 103b of the annular stator core 103 is inserted from the other end side of the bobbin body 107 provided with the second flange portion 109, to mount the bobbin 105 onto the tooth 103b. Then, the second flange portion 109 of the bobbin 105 is placed in close contact with the core bearing surface 103c and fixed to the tooth 103b by a means which is not illustrated (e.g., by means of fitting, bonding, etc.). FIG. 13 shows the magnetic bearing device 100 in which the bobbins 105 having the coils 106 wound therearound are attached to the respective teeth 103b of the annular stator core 103 as described above.

The magnetic bearing device 100 illustrated in FIG. 13 has a structure in which the annular electromagnet 101 is disposed in a non-contact manner and concentrically with the rotor shaft 102 on the radially outer side of the rotor shaft 102. The annular electromagnet 101 is a uniaxial electromagnet by using a pair of coil portions 104 illustrated in FIG. 13. Four pairs of the uniaxial electromagnets are provided at a phase angle of 90 degrees, in which the rotor shaft 102 is attracted by the magnetic force generated by each of these electromagnets and supported in a non-contact manner.

In the annular electromagnet 101 illustrated in FIG. 13, four electromagnets are arranged in pairs along an X axis and a Y axis, as well as in a + direction and a − direction (if necessary, these electromagnets arranged in pairs these pairs are referred to as "electromagnet +X," "electromagnet −X," "electromagnet+Y," and "electromagnet −Y").

According to the structure of the annular electromagnet 101, as illustrated in FIG. 14, in the bobbin 105 attached to each of the respective teeth 103b of a pair of electromagnets −Y1, −Y2, circumferential end surfaces 108a of the first flange portion 108 and circumferential end surfaces 108b of the second flange portion 109 are formed at right angles. Furthermore, the coil wire 106a of each of the coils 106 is wound from the first flange portion 108 to the second flange portion 109 of each bobbin 105 in such a manner that the cross-sectional shape of the bobbin 105 is a substantially rectangular shape. Specifically, rectangular winding is formed.

An attractive force F of each uniaxial electromagnet can be obtained by the following equation (1).

$$F = 4*N^2*i^2/(R^2*S*u)*\cos \alpha = k*N^2 \qquad (1)$$

where N is the number of turns of the coil wire 106a, i a current flowing through the coil wire 106a, R a magnetic resistance, S a magnetic pole area, u a magnetic permeability of an air gap, α a half angle, and k a constant.

From the equation (1), it is clear that the attractive force F of each uniaxial electromagnet (electromagnet+X, electromagnet −X, electromagnet+Y, electromagnet −Y) is proportional to the square of the number of turns of the coil wire 106a.

Therefore, it is important to improve the number of turns of the coil wire 106a wound around each bobbin 105, in order to increase the attractive force F of each uniaxial electromagnet without changing the sizes of components other than the coil 106.

The discussion above is merely provided for general background information and is not intended to be used as an aid in determining the scope of the claimed subject matter. The claimed subject matter is not limited to implementations that solve any or all disadvantages noted in the background.

SUMMARY

However, regarding the bobbins 105 attached to the respective teeth 103b of the annular stator core 103 illustrated in FIGS. 13 and 14, an interval L6 between the first flange portions 108 of the bobbins 105 adjacent to each other is equivalent to an interval between outer edges 108c, as illustrated in FIG. 14. The interval L6 between these adjacent bobbins 105 is required as an interval for preventing the bobbins 105 from interfering with each other during assembly. Thus, it is considered that a winding space of each coil 106 is limited and that improving the attractive force by increasing the number of turns of each coil wire 106a by using the bobbins 105 of the same size has already reached its limit.

Moreover, in the prior art, as a method for increasing the attractive force by increasing the number of turns of the coil wires 106a under the restriction of the coil winding space, for example, as illustrated in FIG. 15, there have been known a structure in which the teeth 103b of the annular stator core 103 are sequentially offset from the center O to the outside by a dimension e and then the bobbin 105 that has the coil 106 wound therearound into a rectangular shape as planarly viewed is attached to each of the teeth 103b, and a structure illustrated in FIG. 16 in which the teeth 103b of the annular stator core 103 are sequentially offset from the center O to the outside by the dimension e and then the bobbin that has the coil wire 106a of the coil 106 wound therearound into a trapezoidal shape as planarly viewed is attached to each of the teeth. Unfortunately, these structures are not sufficient.

Therefore, a technical problem occurs for providing a vacuum pump, and a magnetic bearing device used for such a vacuum pump, and an annular electromagnet, the vacuum pump being capable of increasing the attractive force of electromagnets by increasing the number of turns of a coil wire wound around each bobbin, without changing the shape of the conventional annular stator core 103, i.e., the size of the conventional annular stator core such as, as illustrated in FIGS. 13 and 14, for example, magnetic pole half angle α, thickness L1 of the coil 106, coil width L2, plate thickness L3 of the first flange portion 108, plate thickness L4 of the second flange portion 109, distance between the outermost periphery of the coil 106 and the outermost ends of the flange portions 108, 109 of each bobbin 105, which is the amount of projection L5 of the flange portions 108, 109 from the coil 106, interval L6 between the bobbins 105, interval L7 between the bobbins 105 and the core bearing surface end portions, and magnetic pole connecting thickness L8. An object of the present invention is to solve such a technical problem.

The present invention is proposed in order to achieve the foregoing object, and an invention according to one embodiment is a vacuum pump having a magnetic bearing device that is disposed radially outside of a rotor shaft and rotatably holds the rotor shaft, wherein the magnetic bearing device has an annular stator core having, on an inner peripheral wall thereof, a plurality of teeth provided at predetermined intervals in a circumferential direction of the rotor shaft, and an annular electromagnet having a plurality of bobbins attached to the teeth respectively, the plurality of bobbins having coil wires wound around outer peripheries thereof, the bobbins each having a rectangular cylindrical bobbin body that has the coil wire wound around the outer periphery thereof and is attached to each of the teeth, a first flange portion provided on an end surface of the bobbin body so as to face the rotor shaft and formed into a rectangular hallow shape as viewed from the front, a second flange portion provided on an end surface of the bobbin body so as to be opposite to the first flange portion and formed into a rectangular hallow shape as viewed from the front, and coil winding amount increasing means formed at least on the first flange portion or the second flange portion and increasing the amount of winding of the coil wire wound around the bobbin body.

According to this configuration, since the coil winding amount increasing means for increasing the amount of winding of the coil wire wound around the bobbin body is provided at least on the first flange portion or the second flange portion, a vacuum pump can be realized in which the attractive force of the annular electromagnet is increased by increasing the number of turns of the coil wire wound around each bobbin, without changing the size of the annular stator core of the prior art, so that the vacuum pump can be operated while keeping the rotating rotor shaft stable.

An invention according to a further embodiment provides a vacuum pump in which the coil winding amount increasing means has, on circumferential end faces of the first flange portion, chamfers that are inclined inward from outer edges of the first flange portion in the plate thickness direction.

According to this configuration, the distance between the inner edges of the first flange portions of the adjacent bobbins can be increased by providing the circumferential end surfaces of each of the first flange portions with chamfers that are inclined inward from the outer edges of each first flange portion in the plate thickness direction. Therefore, even when the adjacent bobbins that are arranged on the inner peripheral wall of the annular stator core face the center, the inner edges do not interfere with each other, keeping the distance between the outer edges of the first flange portions wide. Thus, even when the amount of projection of each first flange portion is increased so that the outer edges of the first flange portions of the adjacent bobbins come close to each other, the first flange portions of the adjacent bobbins do not interfere with each other during assembly. Consequently, the vacuum pump can be realized by increasing the distance between the circumferential end surfaces of the first flange portions of the bobbins (the amount of projection of the first flange portion) and increasing and the number of turns of the coil wires to enhance the attractive force of the annular electromagnet, which enables an operation of the vacuum pump while keeping the rotating rotor shaft stable.

An invention according to a further embodiment provides, a vacuum pump in which the coil winding amount increasing means has, on the circumferential end faces of at least the first flange portion of each of the plurality of bobbins adjacent to each other, notches that accommodate parts of the plurality of adjacent bobbins adjacent to each other.

According to this configuration, since the circumferential end surfaces of at least the first flange portions of the adjacent bobbins are provided with the notches for accommodating the parts of the adjacent bobbins, the first flange portions of the adjacent bobbins do not interfere with each other during assembly even when the amount of projection of the first flange portions of the adjacent bobbins is increased to shorten the distance between the inner edges of the first flange portions. Therefore, by increasing the amount of projection of the flange portions to bring the inner edges of the first flange portions of the adjacent bobbins closer to each other, the coil wire is wound as much as possible around each of the adjacent bobbins, to further enhance the attractive force of the annular electromagnet. Consequently, the vacuum pump can be operated while keeping the rotating rotor shaft more stable. Note that better results can be expected by providing these notches in both the first and second flange portions.

An invention according to a further embodiment provides a vacuum pump in which the coil winding amount increasing means has, on circumferential end faces of the second flange portion, chamfers that are inclined inward from inner edges of the second flange portion in the plate thickness direction.

According to this configuration, the chamfers inclined inward from the inner edges dodge the curved shape of the inner peripheral wall of the annular stator core even if the amount of circumferential protrusion of the second flange portion of each bobbin is increased, that is, even if the distance between the circumferential end surfaces is increased. Therefore, the present invention can realize a vacuum pump in which the attractive force of the annular electromagnet is increased by increasing the amount of circumferential projection of the second flange portion of each bobbin and increasing the number of turns of the coil wire, so that the vacuum pump can be operated while keeping the rotating rotor shaft stable.

An embodiment provides a magnetic bearing device that is used in the vacuum pump described in any of the embodiments described above.

According to this configuration, since the coil winding amount increasing means capable of increasing the amount of winding of the coil wire wound around the bobbin body is provided, the present invention can realize a magnetic bearing device in which the attractive force of the annular electromagnet is increased by increasing the number of turns of the coil wire wound around the bobbin body, so that the magnetic bearing device can be operated while keeping the rotating rotor shaft stable.

An embodiment provides an annular electromagnet that is used in the vacuum pump described in any of the embodiments.

According to this configuration, since the coil winding amount increasing means capable of increasing the amount of winding of the coil wire wound around the bobbin body is provided, the present invention can realize an annular electromagnet in which the attractive force thereof is increased by increasing the number of turns of the coil wire wound around the bobbin body, so that the annular electromagnet can be operated while keeping the rotating rotor shaft stable.

The present invention can achieve a vacuum pump capable of increasing the attractive force of electromagnets by increasing the number of turns of a coil wire wound around each bobbin without changing the shape of the annular stator core of the prior art, and a magnetic bearing device and an annular electromagnet that are used in the vacuum pump.

The Summary is provided to introduce a selection of concepts in a simplified form that are further described in the Detail Description. This summary is not intended to identify key features or essential features of the claimed subject matter, nor is it intended to be used as an aid in determining the scope of the claimed subject matter.

BRIEF DESCRIPTION OF THE DRAWINGS

FIG. 17A is a diagram taken along arrow A and FIG. 7B a diagram taken along arrow B;

FIG. 10A is a diagram taken along arrow A and FIG. 10B a diagram taken along arrow B;

DESCRIPTION OF THE PREFERRED EMBODIMENT

Figure 1:
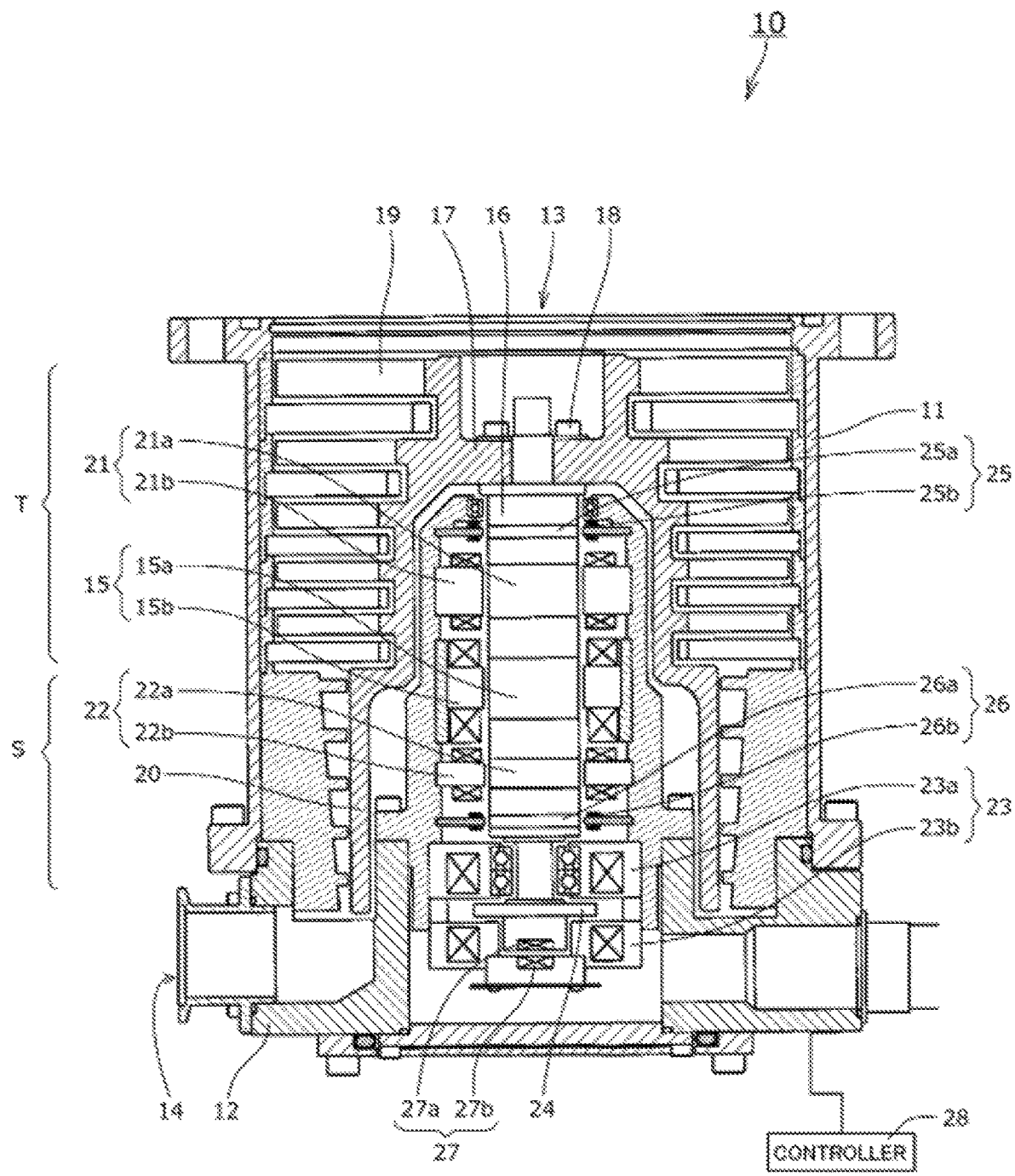
FIG. 1 is a diagram showing a schematic configuration of a vacuum pump according to an embodiment of the present invention.

In order to achieve the object of increasing the attractive force of electromagnets by increasing the number of turns of a coil wire wound around each bobbin, without changing the shape of the conventional annular stator core, the present invention achieved the object with a vacuum pump having a magnetic bearing device that is disposed radially outside of a rotor shaft and rotatably holds the rotor shaft, wherein the magnetic bearing device has an annular stator core having, on an inner peripheral wall thereof, a plurality of teeth provided at predetermined intervals in a circumferential direction of the rotor shaft, and an annular electromagnet having a plurality of bobbins attached to the teeth respectively, the plurality of bobbins having coil wires wound around outer peripheries thereof, the bobbins each having a rectangular cylindrical bobbin body that has the coil wire wound around the outer periphery thereof and is attached to each of the teeth, a first flange portion provided on an end surface of the bobbin body so as to face the rotor shaft and formed into a rectangular hallow shape as viewed from the front, a second flange portion provided on an end surface of the bobbin body so as to be opposite to the first flange portion and formed into a rectangular hallow shape as viewed from the front, and coil winding amount increasing means formed at least on the first flange portion or the second flange portion and increasing the amount of winding of the coil wire wound around the bobbin body.

The best mode for carrying out the present invention is now described hereinafter in detail with reference to the accompanying drawings. Note that in the following description, the same reference numerals are given to the same elements throughout the description of the embodiment. In the following description, expressions indicating directions such as up, down, left, and right are not absolute and are appropriate when the parts of a vacuum pump of the present invention are depicted, but when the positions of the parts are changed, the expressions should be interpreted according to such changes.

EMBODIMENTS

FIG. 1 is a diagram showing a schematic configuration of a vacuum pump 10 according to the present embodiment. Note that FIG. 1 shows a cross section of the vacuum pump 10 along an axial direction thereof. In this embodiment, a so-called composite blade type vacuum pump having a vacuum pump portion T and a thread groove pump portion S is described as an embodiment of the vacuum pump 10. Note that the present embodiment may be applied to a pump having only the vacuum pump portion T or a pump in which a thread groove is provided on the rotating body side.

A casing 11 configuring a housing of the vacuum pump 10 has a cylindrical shape and constitutes the housing of the vacuum pump 10 together with a base 12 provided in a bottom portion of the casing 11. A gas transfer mechanism, which is a structure bringing about exhaust functions of the vacuum pump 10, is stored inside the housing of the vacuum pump 10.

The gas transfer mechanism in the vacuum pump 10 includes the vacuum pump portion T provided on the inlet port 13 side and the thread groove pump portion S provided on the outlet port 14 side. The structure bringing about these exhaust functions is composed mainly of a rotating portion supported rotatably and a stator portion fixed to the casing 11. Furthermore, a controller 28 for controlling the operation of the vacuum pump 10 is connected to the outside of the housing of the vacuum pump 10.

The rotating portion is composed of a rotor shaft (shaft) 16 rotated by a motor portion 15 described hereinafter, and a rotor portion 17.

The rotor shaft 16 is a rotating shaft of a cylindrical member. The rotor portion 17 is attached to an upper end of the rotor shaft 16 by a plurality of bolts 18.

The rotor portion 17 is a rotating member disposed on the rotor shaft 16. The rotor portion 17 includes rotor blades 19 provided on the inlet port 13 side (the vacuum pump portion T), a cylindrical member 20 provided on the outlet port 14 side (the thread groove pump portion S), and the like. Note that the rotor portion 17 is made of a metal such as stainless steel or an aluminum alloy.

The rotor blades 19 are configured by a plurality of blades extending radially from the rotor portion 17 at a predetermined angle from a plane perpendicular to an axis of the rotor shaft 16. In the vacuum pump 10, the rotor blades 19 are provided in a plurality of stages in the axial direction. The cylindrical member 20 is composed of a member, an outer peripheral surface of which has a cylindrical shape.

The motor portion 15 for rotating the rotor shaft 16 is provided in the middle of the rotor shaft 16 in the axial direction thereof. The present embodiment assumes that the motor portion 15 is configured by, for example, a DC brushless motor. A permanent magnet 15a is fixed to a part of the rotor shaft 16 that configures the motor portion 15. The permanent magnet 15a is fixed in such a manner that, for example, the N pole and the S pole thereof are arranged 180 degrees apart around the rotor shaft 16. Also, six electromagnets 15b, for example, are arranged 60 degrees apart around the permanent magnet 15a, with a predetermined gap (air gap) from the rotor shaft 16 in such a manner as to be symmetrical with respect to the axis of the rotor shaft 16 and to be opposed to one another. The permanent magnet 15a functions as a rotor portion (rotating portion) of the motor portion 15, and the electromagnets 15b function as a stator portion (stationary portion) of the motor portion 15.

The vacuum pump 10 has a sensor for detecting a rotation speed and a rotation angle (phase) of the rotor shaft 16, and by means of this sensor, the controller 28 can detect the positions of the magnetic poles of the permanent magnet 15a fixed to the rotor shaft 16.

On the basis of the detected positions of the magnetic poles, the controller 28 switches currents of the electromagnets 15b of the motor portion 15 successively, to generate a rotating magnetic field around the permanent magnet 15a of the rotor shaft 16. The permanent magnet 15a fixed to the rotor shaft 16 follows this rotating magnetic field, thereby rotating the rotor shaft 16.

On the inlet port 13 side and the outlet port 14 side of the motor portion 15 are, respectively, a radial magnetic bearing portion 21 and a radial magnetic bearing portion 22 that support the rotor shaft 16 in a radial direction, that is, support a load of the rotating portion in the radial direction.

Furthermore, a lower end of the rotor shaft 16 is provided with a thrust magnetic bearing portion 23 that supports the rotor shaft 16 in the axial direction (thrust direction), that is, supports the load of the rotating portion in the thrust direction.

The rotor shaft 16 (rotating portion) is supported by the radial magnetic bearing portions 21 and 22 in a non-contact manner in the radial direction (radial direction of the rotor shaft 16), and is supported by the thrust magnetic bearing portion 23 in a non-contact manner in the thrust direction (axial direction of the rotor shaft 16). These magnetic bearings constitute a so-called five-axis control type magnetic bearing, and the rotor shaft 16 only has a degree of freedom of rotation around the axis.

In the radial magnetic bearing portion 21, for example, four electromagnets 21b are arranged 90 degrees apart around the rotor shaft 16 in such a manner as to face each other. These electromagnets 21b are arranged, with a gap (air gap) from the rotor shaft 16. Note that this gap value takes into consideration the amount of vibration (swing amount) of the rotor shaft 16 in a steady state, the spatial distance between the rotor portion 17 and the stator portion (stationary portion), the performance of the radial magnetic bearing portion 21, and the like. Also, a target 21a is formed on the rotor shaft 16 facing the electromagnets 21b. The target 21a is attracted by the magnetic force of the electromagnets 21b of the radial magnetic bearing portion 21, whereby the rotor shaft 16 is supported in a non-contact manner in the radial direction. The target 21a functions as a rotor portion of the radial magnetic bearing portion 21, and the electromagnets 21b function as stator portions of the radial magnetic bearing portion 21.

The radial magnetic bearing portion 22, too, has the same configuration as the radial magnetic bearing portion 21. Specifically, a target 22a is attracted by the magnetic force of electromagnets 22b of the radial magnetic bearing portion 22, whereby the rotor shaft 16 is supported in a non-contact manner in the radial direction.

The thrust magnetic bearing portion 23 causes the rotor shaft 16 to levitate in the axial direction via a disc-shaped metal armature 24 that is provided perpendicular to the rotor shaft 16. In the thrust magnetic bearing portion 23, for example, two electromagnets 23a, 23b are arranged so as to face each other via the armature 24. These electromagnets 23a, 23b are arranged, with a gap from the armature 24. Note that this gap value takes into consideration the amount of vibration of the rotor shaft 16 in a steady state, the spatial distance between the rotor portion 17 and the stator portion, the performance of the thrust magnetic bearing portion 23, and the like. The armature 24 is attracted by the magnetic force of the electromagnets of the thrust magnetic bearing portion 23, whereby the rotor shaft 16 is supported in a non-contact manner in the thrust direction (axial direction).

Moreover, displacement sensors 25, 26 are formed in the vicinity of the radial magnetic bearing portions 21, 22, respectively, so that displacement of the rotor shaft 16 in the radial direction can be detected. In addition, a displacement sensor 27 is formed at the lower end of the rotor shaft 16, so that displacement of the rotor shaft 16 in the axial direction can be detected.

The displacement sensors 25, 26 are elements for detecting displacement of the rotor shaft 16 in the radial direction and, in the present embodiment, are configured by inductance-type sensors such as eddy current sensors having coils 25b, 26b. The coils 25b, 26b of the displacement sensors 25, 26 are part of an oscillation circuit, not illustrated, which is formed in the controller installed outside the vacuum pump 10. The displacement sensor 25 is configured to have a high-frequency current flow therein as the oscillation circuit oscillates, thereby generating a high-frequency magnetic field on the rotor shaft 16. Then, the oscillation amplitude of the oscillation circuit changes when the distance between the displacement sensors 25, 26 and the targets 25a, 26a changes, whereby the displacement of the rotor shaft 16 can be detected. The sensors for detecting displacement of the rotor shaft 16 are not limited to the foregoing sensors, and, for example, capacitive sensors or optical sensors may be used.

Also, once the displacement of the rotor shaft 16 in the radial direction is detected on the basis of signals from the displacement sensors 25, 26, the controller 28 adjusts the magnetic force of each of the electromagnets 21b, 22b of the radial magnetic bearing portions 21, 22 to bring the rotor shaft 16 back to a predetermined position. In this manner, the controller 28 performs feedback control on the radial magnetic bearing portions 21, 22 on the basis of the signals from the displacement sensors 25, 26. As a result, the rotor shaft 16 is magnetically levitated in the radial direction, via a predetermined air gap from the electromagnets 21b, 22b in the radial magnetic bearing portions 21, 22, and held in the air in a non-contact manner.

As with the displacement sensors 25, 26, the displacement sensor 27 is configured to have a coil 27b. The displacement sensor 27 detects displacement of the rotor shaft 16 in the thrust direction by detecting the distance between the coil 27b and a coil 27a that is provided on the rotor shaft 16 side so as to face the coil 27b. Once the displacement of the rotor shaft 16 in the thrust direction is detected on the basis of a signal from the displacement sensor 27, the controller 28 adjusts the magnetic force of each of the electromagnets 23a, 23b of the thrust magnetic bearing portion 23 to bring the rotor shaft 16 back to a predetermined position. In this manner, the controller 28 performs feedback control on the thrust magnetic bearing portion 23 on the basis of the signal from the displacement sensor 27. As a result, the rotor shaft 16 is magnetically levitated in the thrust direction, via a predetermined air gap from each of the electromagnets 23a, 23b in the thrust magnetic bearing portion 23, and held in the air in a non-contact manner.

Since the rotor shaft 16 is held by the radial magnetic bearing portions 21, 22 in the radial direction and held by the thrust magnetic bearing portion 23 in the thrust direction as described above, the rotor shaft 16 can rotate about the axis.

The motor portion 15 and each of the magnetic bearing portions 21, 22 of the present embodiment function as the annular electromagnets 21b according to the present invention that use the actions of electromagnet force.

Figure 2:
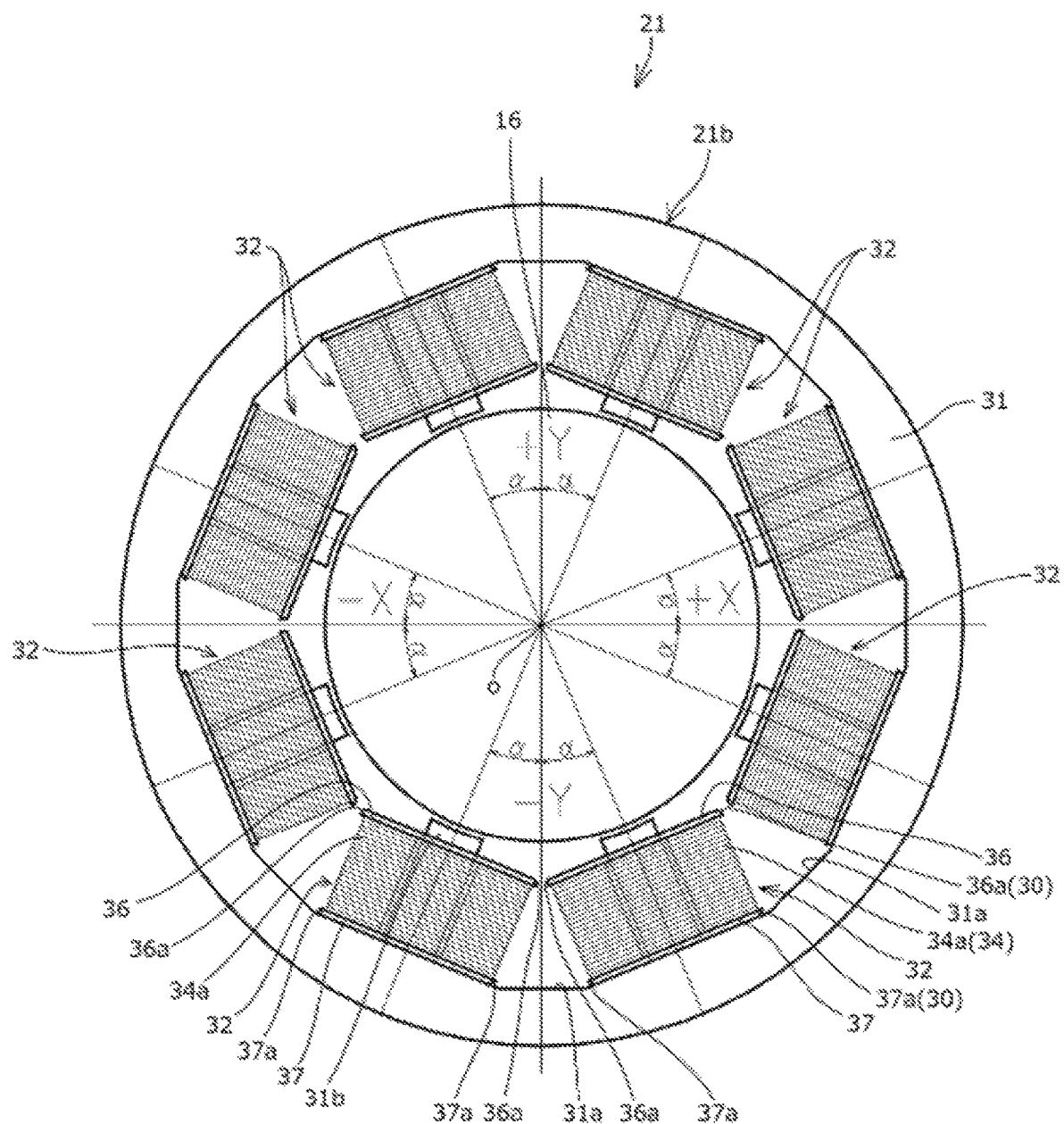
FIG. 2 is a diagram showing a schematic configuration of a magnetic bearing portion of FIG. 1.
Figure 3:
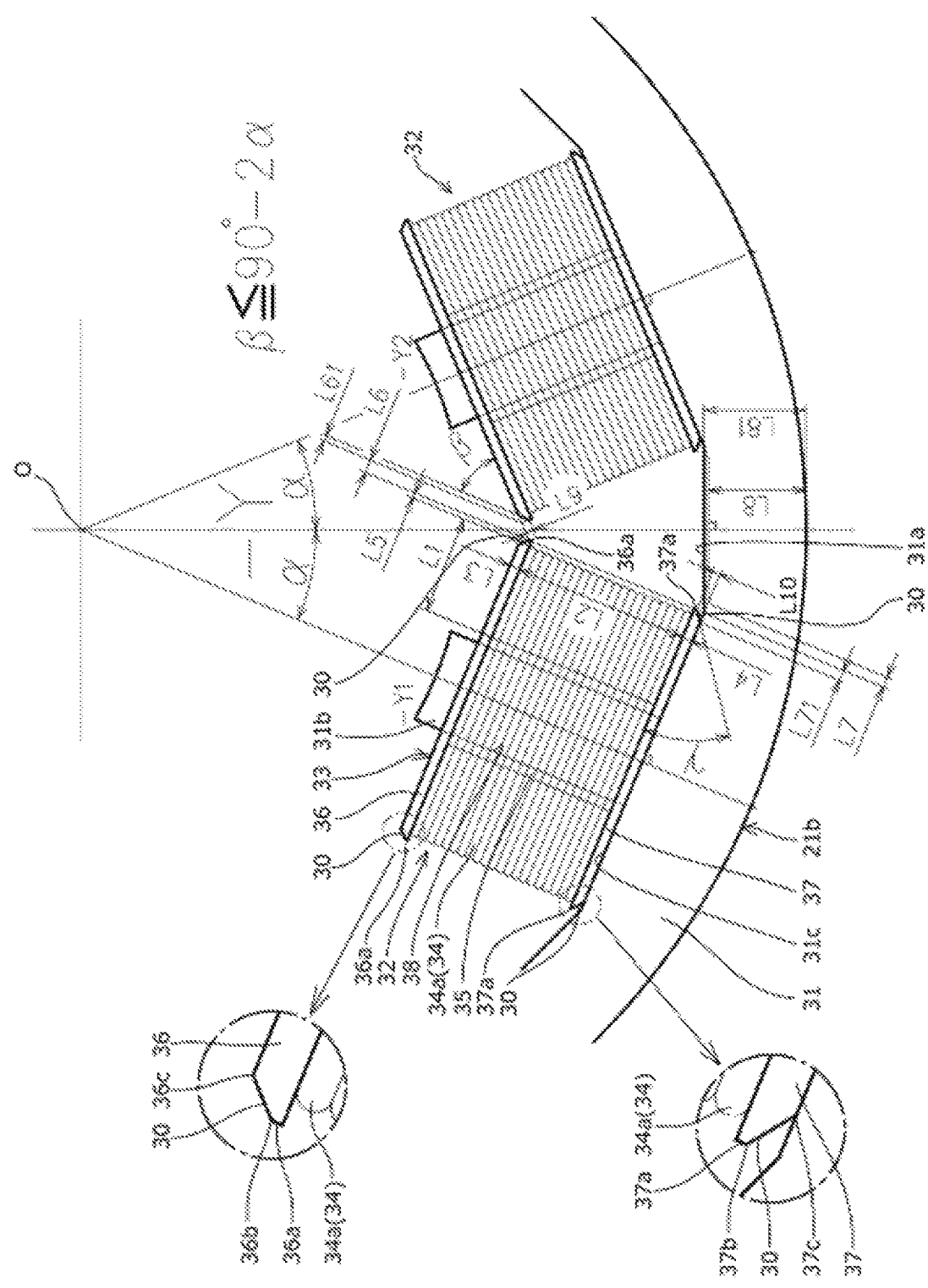
FIG. 3 is a schematic configuration diagram showing an enlargement of a part of an annular electromagnet illustrated in FIG. 2.

Configurations of the magnetic bearing portions 21, 22 are further described using FIGS. 2 and 3. Since the magnetic bearing portions 21, 22 share the same configuration, the structure of the magnetic bearing portion 21 is mainly described. Therefore, although FIGS. 2 and 3 each show the cross section of the part corresponding to line D-D of FIG. 1, the illustration of the hatched sections is omitted in order to simplify the drawings.

In FIGS. 2 and 3, the magnetic bearing portion 21, which is a magnetic bearing device, has a structure in which the electromagnets 21b, which are annular electromagnets (referred to as "annular electromagnets 21b" hereinafter), are arranged in a non-contact manner and concentrically with the rotor shaft 16 on the radially outer side of the rotor shaft 16. The annular electromagnets 21b each have a stator core 31 in an annular shape (referred to as "annular stator core 31" hereinafter) and a plurality of coil portions 32 attached to an inner peripheral wall 31a of the annular stator core 31.

The annular stator core 31 is formed from a laminated silicon steel sheet and is provided with eight teeth 31b that protrude so as to project from an inner peripheral wall 31a toward a center O of the annular stator core 31 (which is also the center O of the rotor shaft 16), with predetermined intervals in the circumferential direction, at a phase angle of, in the illustrated embodiment, 2α and 90°−2α. The cross-sectional shape of each of the teeth 31b is a rectangular shape. The coil portions 32 are attached to the teeth 31b respectively. Flat core bearing surfaces 31c for placing second flange portions 37 of bobbins 33 in close contact with the inner peripheral wall 31a are provided at base portions of the respective teeth 31b on which the respective coil portions 32 are mounted, the base portions being part of the inner peripheral wall 31a of the annular stator core 31.

The coil portions 32 include, respectively, the bobbins 33 and coils 34 formed by winding coil wires 34a around the outer peripheries of the bobbins 33a predetermined number of times.

The bobbins 33 are each formed of an insulating material such as resin and each integrally have a bobbin body 35, a first flange portion 36, and a second flange portion 37.

The bobbin body 35 is a cylindrical body having a rectangular cross section, which penetrates in a front-rear direction and has a rectangular insertion hole 38 through which the corresponding tooth 31b can be inserted. In other words, the bobbin body 35 is a rectangular cylindrical body (so-called square tube). The coil wire 34a of the coil 34 is wound around an outer peripheral surface of the bobbin body 35 the predetermined number of times.

The first flange portion 36 is a flat flange portion having a rectangular hollow shape when viewed from the front, i.e., having a hole in the center thereof, and is provided on one end surface of the bobbin body 35 located near the center O of the annular stator core 31 in such a manner as to protrude from the outer peripheral surface of the bobbin body 35 to the outside at a substantially right angle.

The second flange portion 37 is a flat flange portion having a rectangular hollow shape when viewed from the front, i.e., having a hole in the center thereof as with the first flange portion 36, and is provided on an end surface of the bobbin body 35, opposite to the first flange portion 36, in such a manner as to protrude from the outer peripheral surface of the bobbin body 35 to the outside at a substantially right angle.

In each of the bobbins 33 formed as described above, after winding the coil wire 34a around the outer peripheral surface of the bobbin body 35 the predetermined number of times, the tooth 31b of the corresponding annular stator core 31 is inserted from the other end side of the bobbin body 35 that is provided with the second flange portion 37, to mount the bobbin 33 onto the tooth 31b. Then, the second flange portion 37 of the bobbin 33 is placed in close contact with the core bearing surface 31c and fixed to the tooth 31b by a means which is not illustrated (e.g., by means of fitting, bonding, etc.). FIG. 2 shows the radial magnetic bearing device 21 in which the bobbins 33 are attached to the respective teeth 31b of the annular stator core 31 as described above. Each annular electromagnet 21b is a uniaxial electromagnet using a pair of coil portions 32 illustrated in FIG. 3. Four pairs of the uniaxial electromagnets are provided at a phase angle of 90 degrees, in which the rotor shaft 16 is attracted by the magnetic force generated by each of these electromagnets and supported in a non-contact manner.

In the annular electromagnet 21b illustrated in FIGS. 2 and 3, four electromagnets are arranged in pairs along the X axis and the Y axis, as well as in the + direction and the − direction (if necessary, these electromagnets arranged in pairs are referred to as "electromagnet +X," "electromagnet −X," "electromagnet+Y," and "electromagnet −Y"). Since these electromagnets +X, −X, +Y, and −Y share the same structure, FIG. 3 only shows the electromagnet −Y. Thus, the configuration of the electromagnet −Y described below is applied to the electromagnets +X, −X, and +Y as well.

The electromagnet −Y of the embodiment illustrated in FIG. 3 is a uniaxial electromagnet configured by an electromagnet −Y1 and an electromagnet −Y2. In the bobbin 33 attached to the tooth 31b of the electromagnet −Y1 and the bobbin 33 attached to the tooth 31b of the electromagnet −Y2, circumferential end surfaces 36a of the first flange portion 36 and circumferential end surfaces 37a of the second flange portion 37 are chamfered into coil winding amount increasing means 30. Note that the electromagnet −Y1 and the electromagnet −Y2 are symmetrical with respect to a angle and that the parts of the electromagnet −Y1 and the parts of the electromagnet −Y2 share the same structure. Therefore, in FIG. 3, the detailed reference numerals corresponding to the description are given only to the electromagnet −Y 1, but for the electromagnet −Y2, reference numerals are given generically and omitted accordingly.

Specifically, each end surface 36a of the first flange portion 36 is chamfered to have a width L9 so as to be inclined inward at a chamfer angle θ from an outer edge 36b to an inner edge 36c in the direction of a plate thickness L3 of the first flange portion 36. Here, β≤90°−2α, L9≤L3. This chamfering of each end surface 36a of the first flange portion 36 reduces a protrusion amount L61 of the inner edge 36c to effectively increase the interval L6 between the first flange portions 36. In other words, the protrusion amount L61 contributes to increasing the interval between the bobbins 33, that is, the amount of projection of the first flange portion 36, and allows the first flange portion 36 to project to both sides in the circumferential direction, to contribute to increasing the number of turns of the coil wire 34a. This interval increase L6 between the bobbins 33 is obtained by the following equation (2).

$$L61 = L9 \times \sin 2\alpha \quad (2)$$

Each end surface 37a of the second flange portion 37, on the other hand, is chamfered to have a width L10 so as to be inclined inward at a chamfer angle γ from an inner edge 37c to an outer edge 37b in the direction of a plate thickness L4 of the second flange portion 37. Here, L10≤L4. This chamfering of each end surface 37a of the second flange portion 37 reduces a protrusion amount L71 of the inner edge 37c to effectively increase an interval L7 between an end portion of the corresponding core bearing surface 31c and the bobbin 33 (L7+L71). In other words, as with the first flange portion 36, the protrusion amount L71 of outer edge 37b contributes to increasing the amount of projection of the second flange portion 37, and allows the second flange portion 37 to project to both sides in the circumferential direction, to contribute to increasing the number of turns of the coil wire 34a. The interval L71 between the end portion of the core bearing surface 31c and the bobbin 33 is obtained by the following equation (3).

$$L71 = L10/\tan \gamma \quad (3)$$

A magnetic pole connecting thickness L81 between the bobbins 33 can also be increased. Specifically, when L8 represents a magnetic pole connecting thickness obtained by not chamfering each end surface 37a of the second flange portion 37 according to the illustrated embodiment, the magnetic pole connecting thickness L81 of the illustrated embodiment is expressed by the following equation (4), in which it is clear that the magnetic pole connecting thickness L81 according to the illustrated embodiment is greater than the magnetic pole connecting thickness L8 of the structure of the prior art.

$$L81 = L8 + L7 \times \sin \gamma > L8 \quad (4)$$

Therefore, in the annular electromagnet 21b illustrated in FIGS. 2 and 3, because the circumferential end surfaces 36a of the first flange portion 36 are each chamfered at an angle from the outer edge 36b toward the inside in the plate thickness direction of the first flange portion 36, the distance between the outer edges 36b of the first flange portions 36 of the adjacent bobbins 33 is increased, contributing to increasing the amount of projection of the first flange portions 36.

Figure 4:
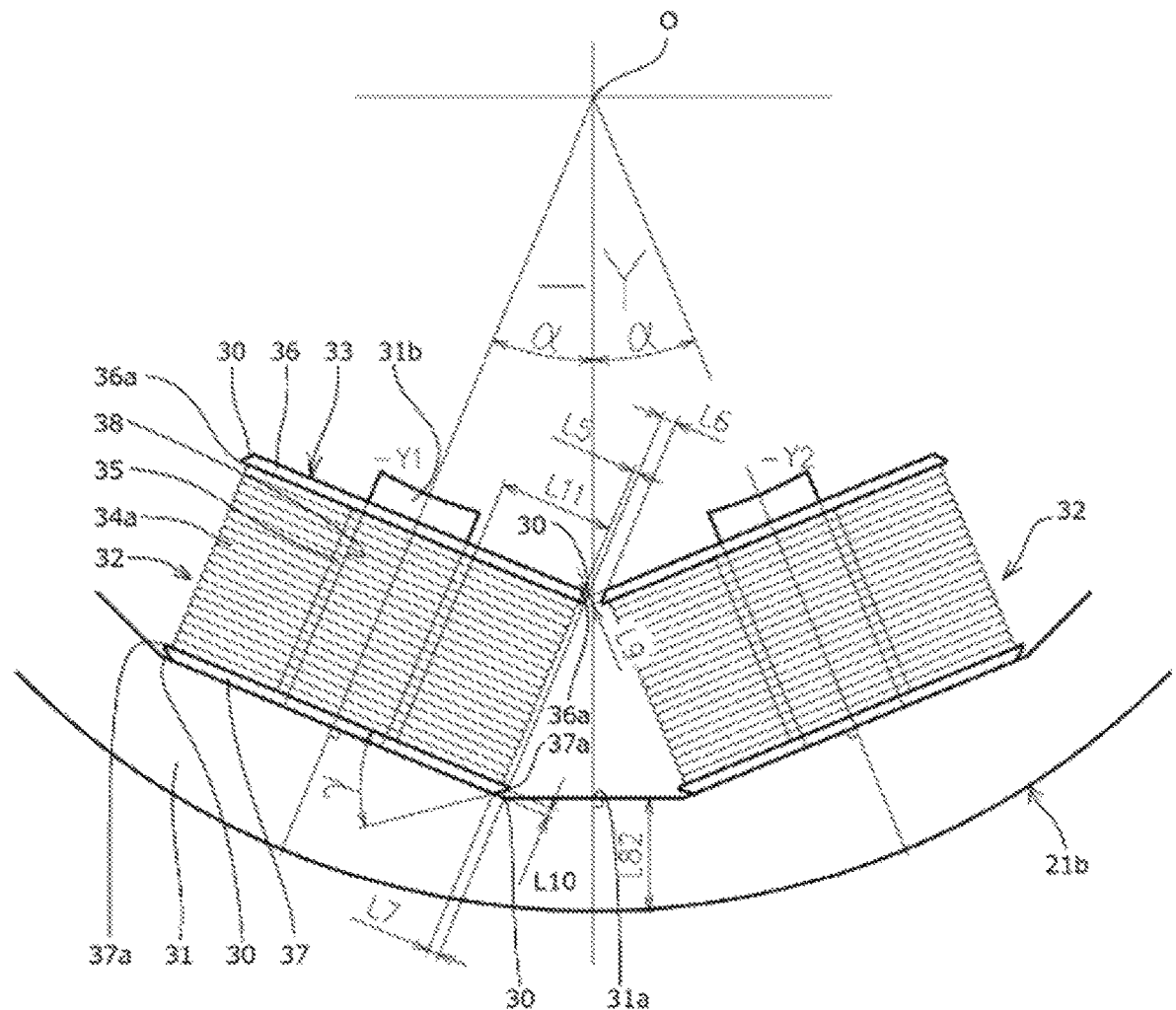
FIG. 4 is a schematic configuration diagram showing a state in which the amount of projection of flange portions illustrated in FIG. 3 is increased to shorten the distance between bobbins.

As a result, as illustrated in FIG. 4, for example, even when the amount of projection of the first flange portions 36 is increased so that the outer edges 36b of the first flange portions 36 of the adjacent bobbins 33 come close to each other, the first flange portions 36 of the adjacent bobbins 33 do not interfere with each other at the time of assembly. Therefore, increasing the amount of projection of the circumferential end surfaces 36a of the first flange portion 36 of the bobbin 33 can increase the number of turns of the coil wire 34a, thereby enhancing the attractive force of the annular electromagnet 21b. In other words, in a case where the amount of projection of the bobbins 33 illustrated in FIG. 3 is increased to narrow the interval L61, a thickness L1 of each coil 34 is expressed by the following equation (5), and the number of turns of the coil wire 34a can be made greater than the thickness L1 of the coil 34 when the interval L61 between the bobbins 33 illustrated in FIG. 3 is not narrowed.

$$L11 = L1 + L9 \times \tan 2\alpha/2 > L1 \quad (5)$$

Furthermore, since the circumferential end surfaces 37a of the second flange portion 37 are each chamfered at an angle from the inner edge 37c toward the inside in the direction of the plate thickness LA of the second flange portion 37, these inclined chamfered surfaces function as the coil winding amount increasing means 30 and dodge the curved shape (magnetic pole connecting part) of the inner peripheral wall 31a of the annular stator core 31, resulting in an increase of the amount of projection between the circumferential end surfaces of the second flange portions 37 of the bobbins 33. Therefore, the number of turns of each coil wire 34a can be increased and thereby the attractive force of the annular electromagnet 21b can be enhanced. Moreover, a magnetic pole connecting thickness L82 according to the present embodiment and the conventional magnetic pole connecting thickness L8 of the prior art establish the chamfer angle γ so as to satisfy L82≥L8. Specifically, L71≤L7+L9×tan 2α/2 tan γ≤L10/(L7+L9×tan 2α/2) are established, in which the number of turns of each coil wire 34a and the attractive force of the annular electromagnet 21b can be increased by increasing γ.

The bobbins 33 of the annular electromagnet 21b of the foregoing embodiment adopt the structure in which the circumferential end surfaces 36a of each of the first flange portions 36 and the circumferential end surfaces 37a of each of the second flange portions 37 of the electromagnets −Y1 and −Y2 are chamfered. However, chamfering does not need to be performed on the end surfaces of the both electromagnets but may be performed as in the following (a) to (c) or by combining them, as illustrated in FIGS. 2 and 3.

(a) Of the first flange portion 36 of the electromagnet −Y1 and the first flange portion 36 of the electromagnet −Y2, chamfering on the both end surfaces 36a of the first flange portion 36 side is performed at least on the end surface 36a on the left side of the electromagnet −Y2 or on the right side of the electromagnet −Y1.

(b) Of the first flange portion 36 of the electromagnet −Y1 and the first flange portion 36 of the electromagnet −Y2, chamfering on the both end surfaces 36a of the first flange portion 36 side is performed at least on the end surfaces 36a on the left side and the right side of the electromagnet −Y2 or on the left side and the right side of the electromagnet −Y1.

(c) Of the second flange portion 37 of the electromagnet −Y1 and the second flange portion 37 of the electromagnet −Y2, chamfering on the both end surfaces 37a of the second flange portion 37 side is performed at least on the end surfaces 37a on the right side of the electromagnet −Y and the left side of the electromagnet −Y2. In this case, the coil width is L2+L71×tan γ>L2, obtaining the coil 34 having a large number of turns of the coil wires 34a. Further, the magnetic pole connecting thickness L81 is L8+L71×sin γ>L8, in which magnetic saturation hardly occurs.

Figure 5:
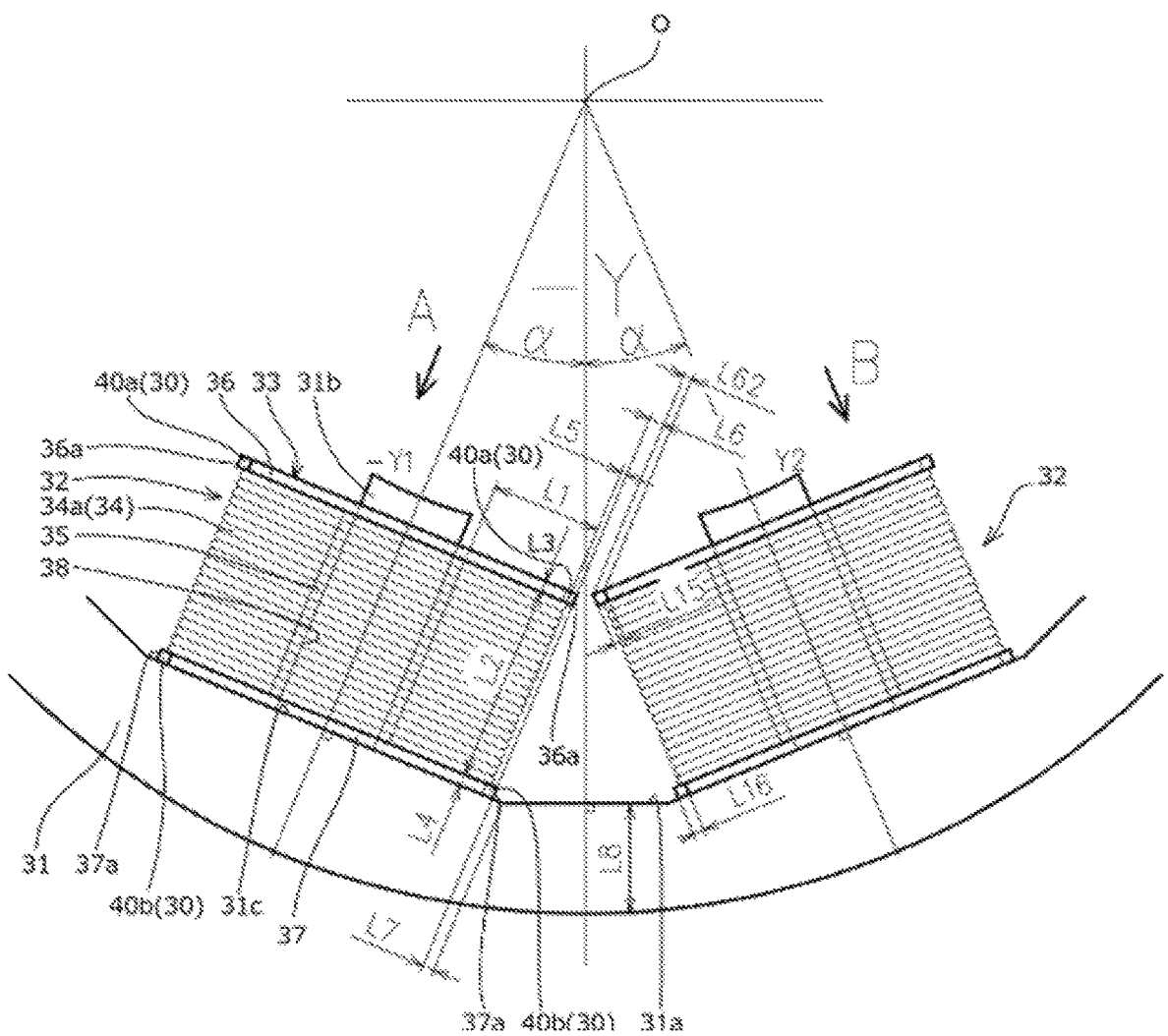
FIG. 5 is a schematic configuration diagram showing a first modification of the annular electromagnet of FIG. 2.
Figure 6:
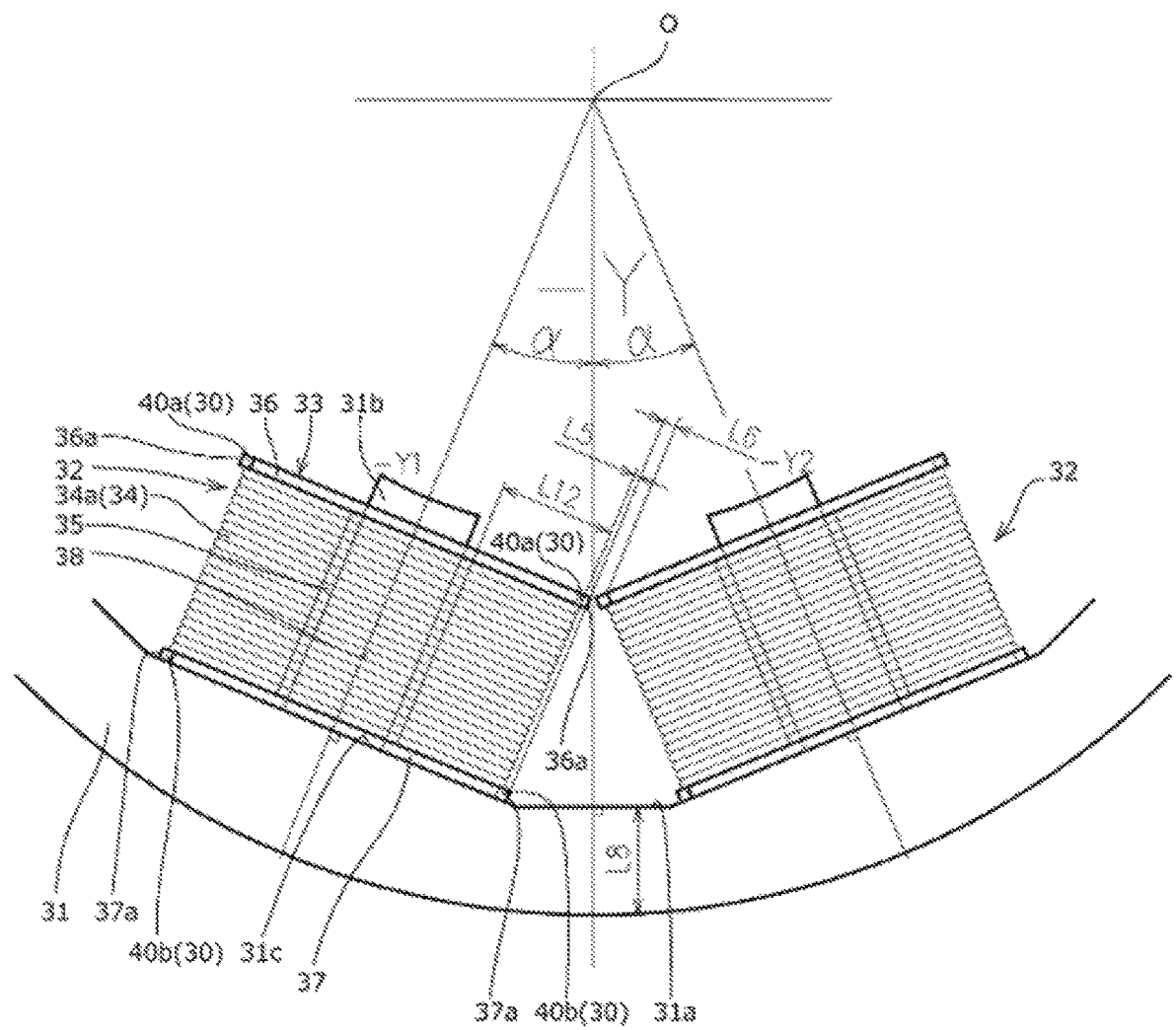
FIG. 6 is a schematic configuration diagram showing a state in which the amount of projection of the flange portions of the annular electromagnet illustrated in FIG. 5 is increased to shorten the distance between the bobbins.
Figure 7:
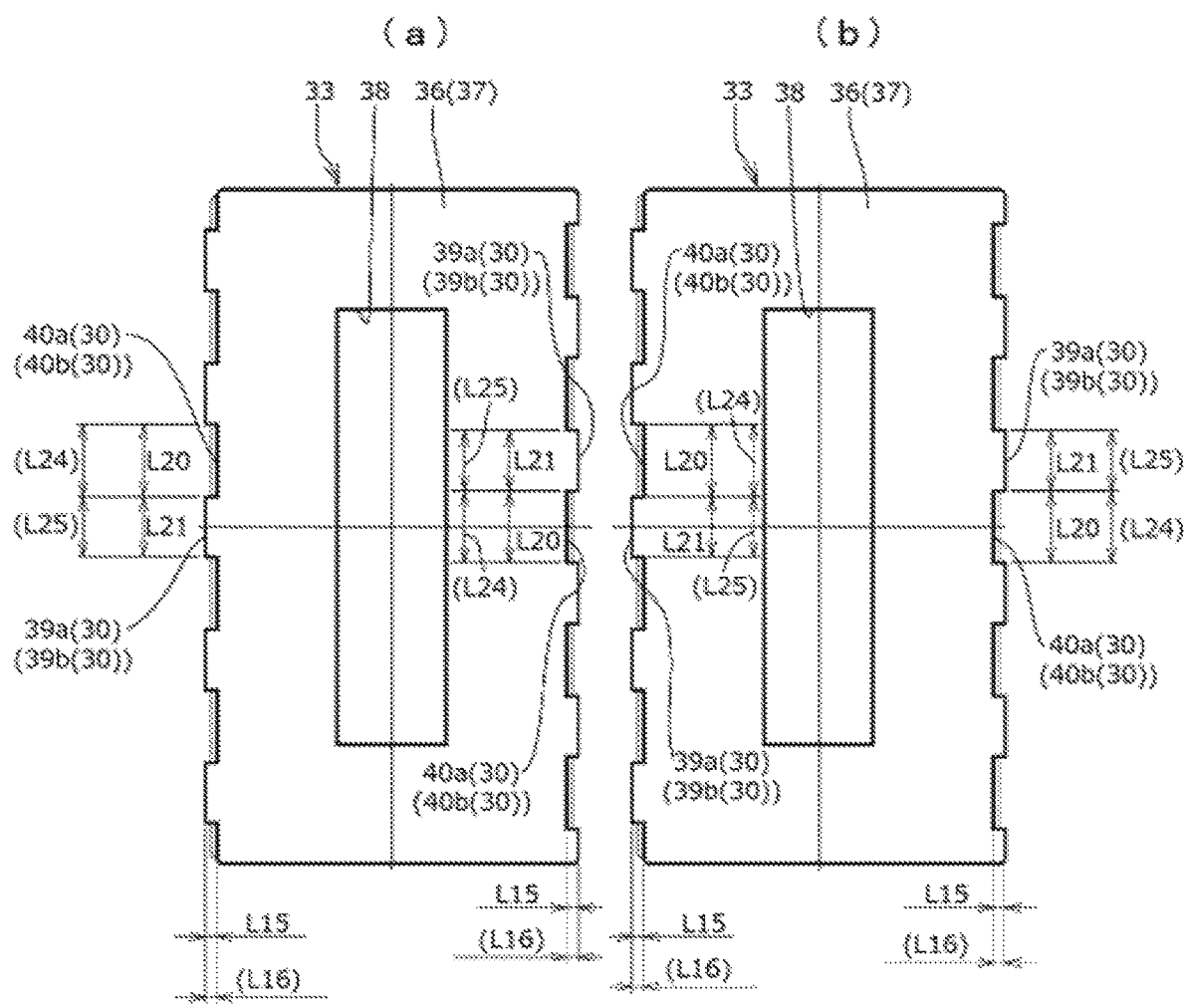
FIGS. 7A and 7B are a plan view of the bobbins taken along arrows A and B illustrated in FIG. 5, where

FIGS. 5 to 7 each show a first modification of the annular stator core 31. FIGS. 5 and 6 correspond to the electromagnet −Y illustrated in FIGS. 3 and 4 and omit the illustration of the hatched section for the purpose of simplification. Also, FIGS. 7A and 7B show the bobbins 33 of the annular stator core 31 of FIGS. 5 and 6. FIGS. 7A and 7B are a plan view taken along arrows A and B of FIG. 5. In the following description, the same reference numerals are given to the parts corresponding to the annular stator core 31 illustrated in FIG. 2 to 4, and redundant explanations are omitted accordingly. Thus, only the parts having different configurations are described. In addition, the electromagnet −Y1 and the electromagnet −Y2 illustrated in the first modification are symmetrical with respect to the a angle, and the parts of the electromagnet −Y1 and the parts of the electromagnet −Y2 share the same structure. Therefore, in FIGS. 5 and 6, the detailed reference numerals corresponding to the description are given only to the electromagnet −Y1, but for the electromagnet −Y2, reference numerals are given generically and omitted accordingly.

The electromagnet −Y illustrated in FIGS. 5 and 6 is a uniaxial electromagnet having the electromagnet −Y1 and the electromagnet −Y2. In the bobbin 33 attached to the tooth 31b of the electromagnet −Y1 and the bobbin 33 attached to the tooth 31b of the electromagnet −Y2, as illustrated in FIGS. 7A and 7B, a plurality of recess portions 40a that function as notches for accommodating portions 39a of these adjacent bobbins 33 are arranged as the coil winding amount increasing means, at a predetermined pitch along a vertical direction, on the circumferential end surfaces 36a of the respective first flange portions 36.

The recess portion 40a on the right side and the left side of the first flange portion 36 of the bobbin 33 attached to the tooth 31b of the electromagnet −Y1 are shifted by approximately 1 pitch in the vertical direction in relation to the recess portions 40a on the left side and right side of the first flange portion 36 of the bobbin 33 attached to the tooth 31b of the electromagnet −Y2.

On the other hand, the circumferential end surfaces 37a of the second flange portions 37 of the bobbin 33 attached to the tooth 31b of the electromagnet −Y1 and of the bobbin 33 attached to the tooth 31b of the electromagnet −Y2, too, are provided with a plurality of recess portions 40b as notches which are arranged at approximately the same pitch as in the both circumferential end surfaces 36a of the first flange portions 36 and accommodate the portions 39b of the bobbins 33, as indicated by the parenthesized reference numerals illustrated in FIGS. 7A and 7B.

Note that a notch depth L15 of each of the recess portions 40a of the first flange portions 36 is equal to a notch depth L16 of each of the recess portions 40b (L15=L16). Also, a width L20 of each of the recess portions 40a of the first flange portions 36 is equal to a width L24 of each of the recess portions 40b of the second flange portions 37 (L20=L24), and a distance L21 between the recess portions 40a of each first flange portion 36 is equal to a distance L25 between the recess portions 40b of each second flange portion 37 (L21=L25). Furthermore, the width L20 of each recess portion 40a in the first flange portions 36 and the width L24 of each recess portion 40b in the second flange portion 37 are configured to be greater than the distance L21 between the recess portions 40a of each first flange portion 36 and the distance L25 between the recess portions 40b of each second flange portion 37 (L20>L21, L24<L25).

Therefore, according to this structure, even when the amounts of projection of the first flange portion 36 and the second flange portion 37 are increased and thereby the bobbin 33 of the electromagnet −Y1 and the bobbin 33 of the electromagnet −Y2 are arranged close to each other, the portions 39b and 39a of the second flange portion 37 in the bobbin 33 of the electromagnet −Y2 are sequentially fitted in the recess portions 40a on the right hand side of the bobbin 33 of the electromagnet −Y1 and are dodged when the bobbin 33 of the electromagnet −Y1 and the bobbin 33 of the electromagnet −Y2 are attached to the respective teeth 31b. Consequently, the bobbins 33 adjacent to each other can be attached to the respective teeth 31b so as not to interfere with each other. In this case, increasing the amount of projection of the first flange portion 36 and the amount of projection of the second flange portion 37 in the bobbins 33 allows the coil wires 34a to be wound up to approximately ½ the notch depth L15 of the recess portions 40a. Therefore, the number of turns of the coil wires 34a can be increased and thereby the thickness L of the coils 34 can be increased. Specifically, when a thickness L12 of each coil 34 illustrated in FIG. 6 is L1+L15/2>L1, with L15 being the notch depth of each first flange portion 36, the coils 34 having a higher number of turns of the coil wires 34a can be obtained.

Figure 8:
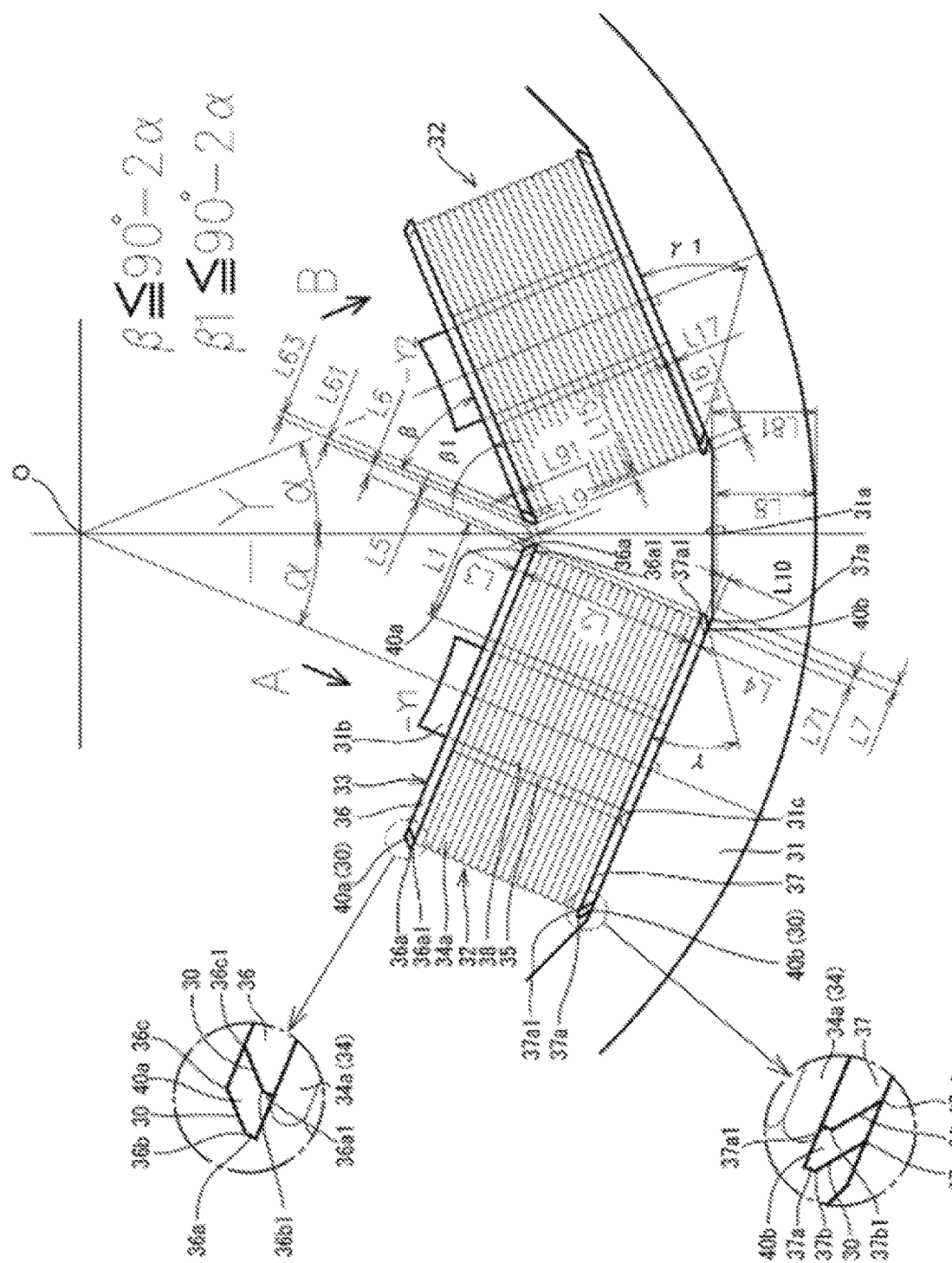
FIG. 8 is a schematic configuration diagram showing a second modification of the annular electromagnet.
Figure 9:
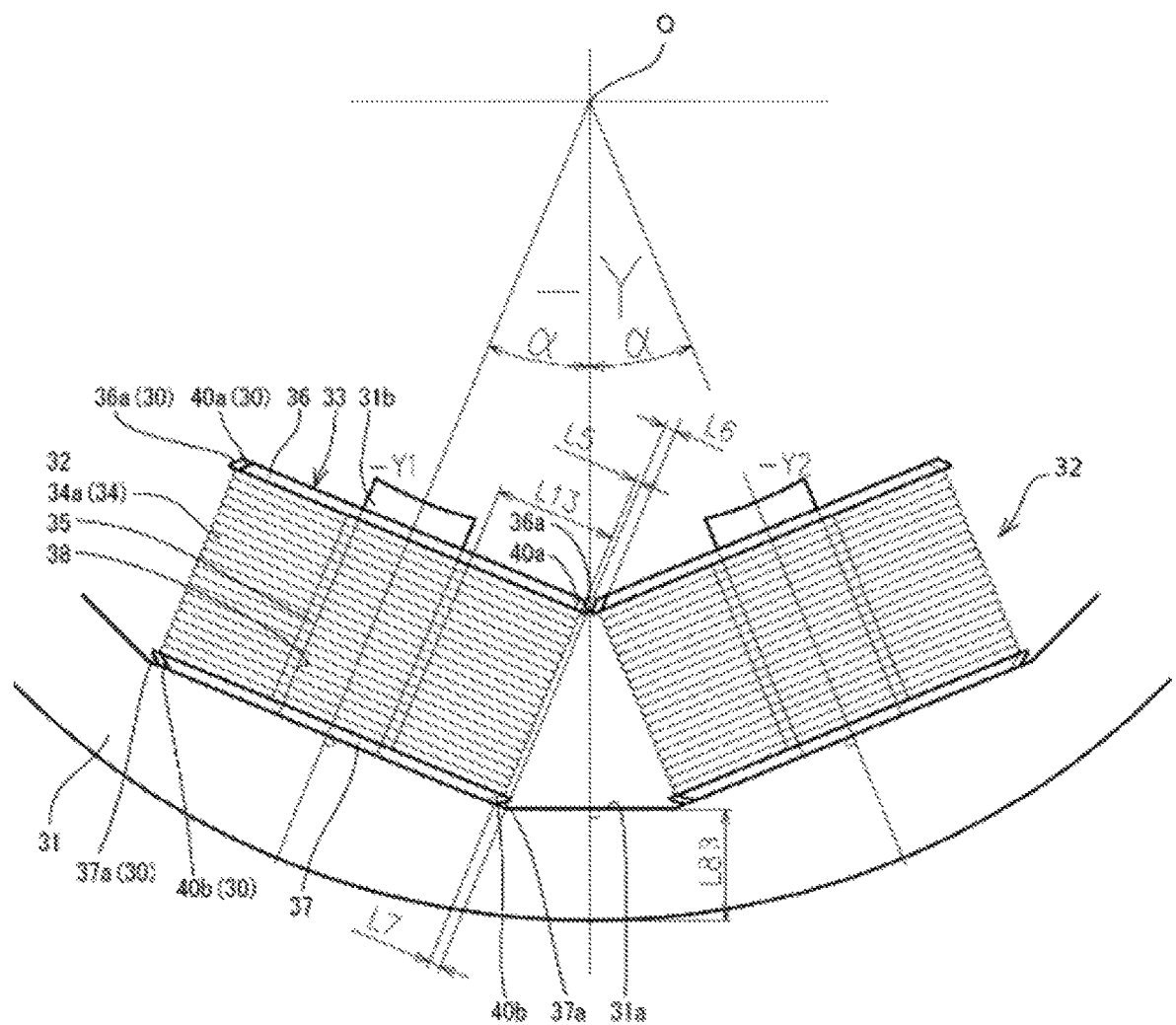
FIG. 9 is a schematic configuration diagram showing a state in which the distance of projection of the flange portion of the annular electromagnet illustrated in FIG. 8 is increased to shorten the distance between the bobbins.
Figure 10:
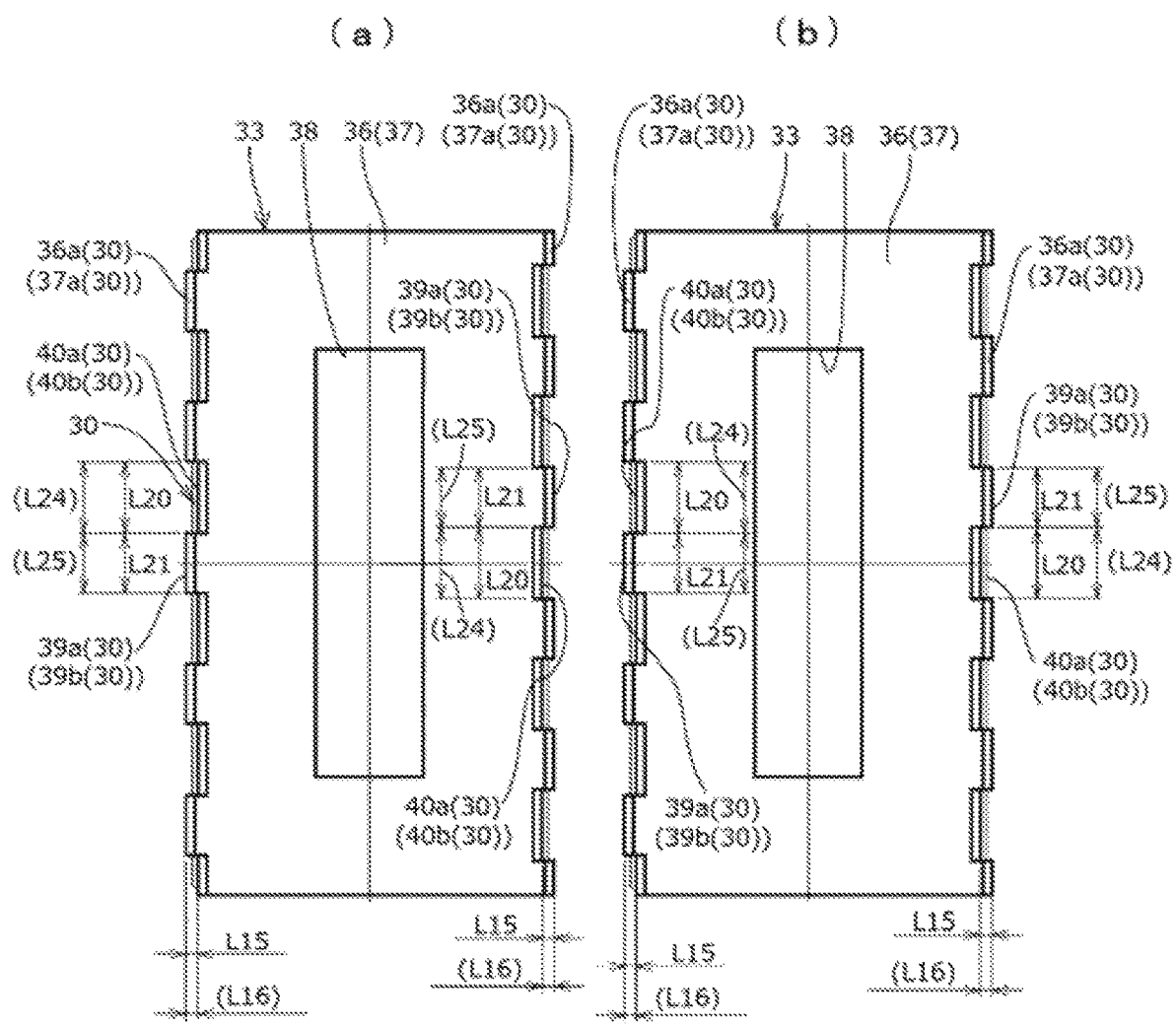
FIGS. 10A and 10B are a plan view of the bobbins taken along arrows A and B illustrated in FIG. 8, where
Figure 11:
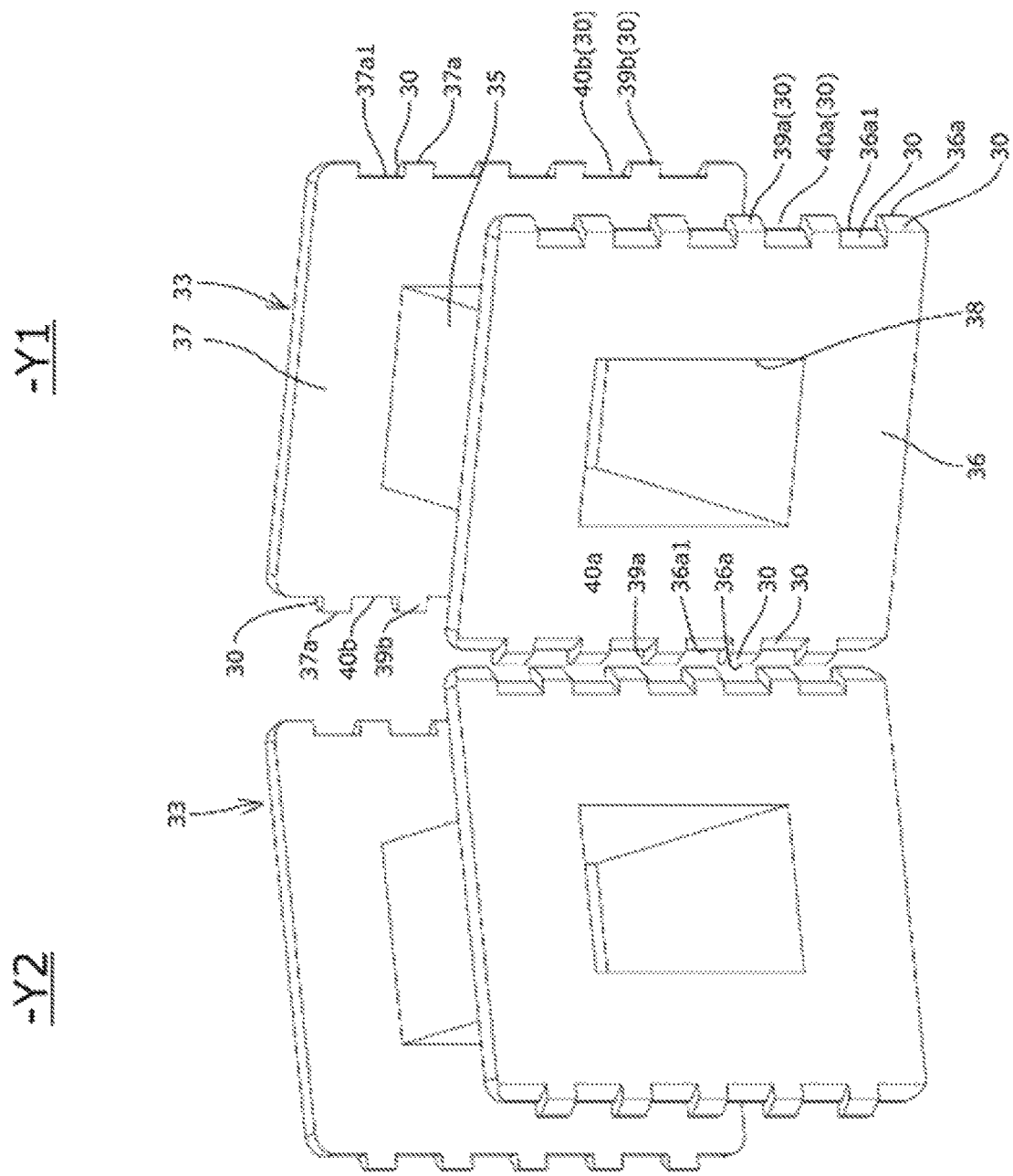
FIG. 11 is a schematic perspective view of the bobbins of FIG. 8, viewed from the center of the annular stator core.
Figure 12:
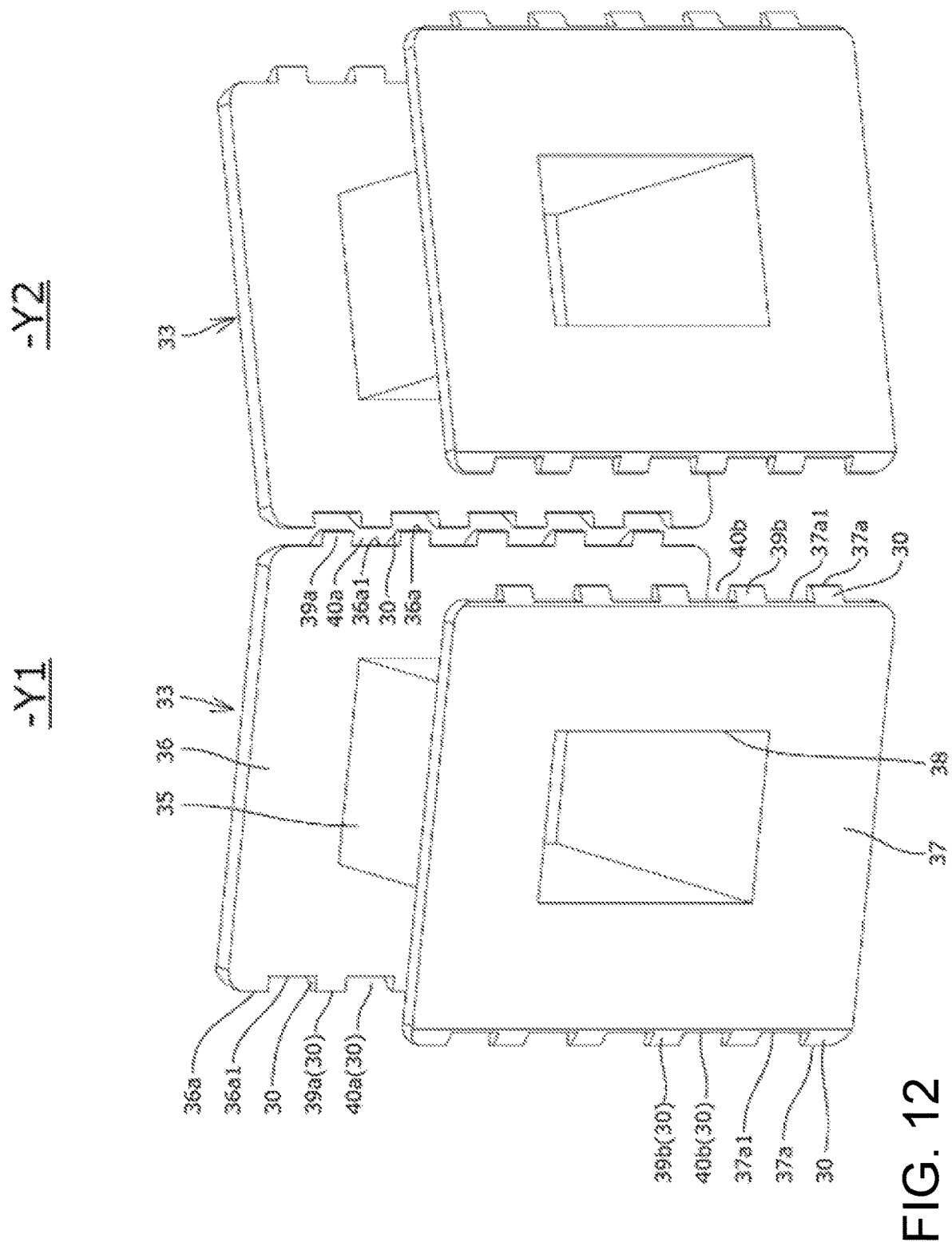
FIG. 12 is a schematic perspective view of the bobbins of FIG. 8, viewed from an outer periphery of the annular stator core.
Figure 13:
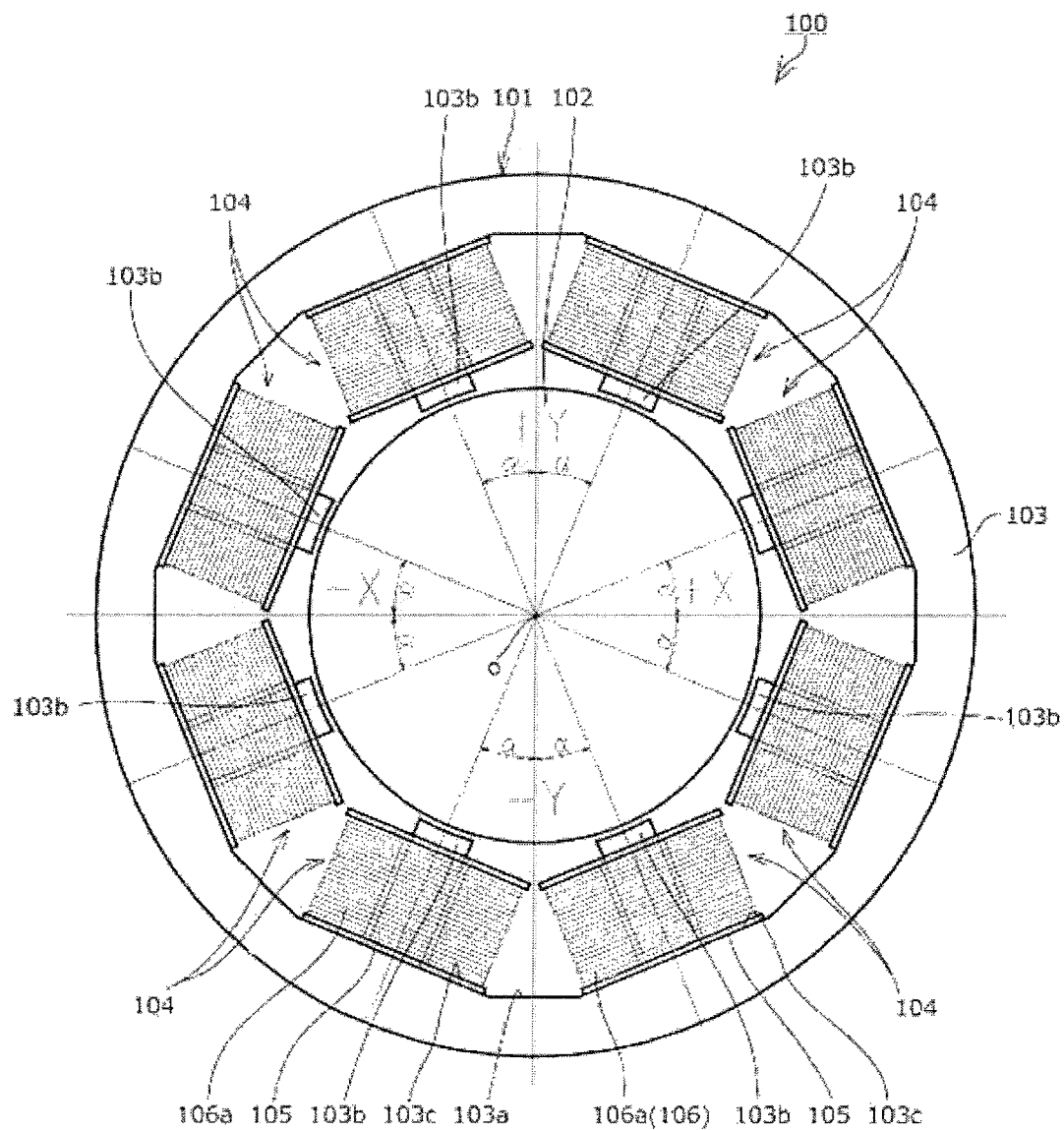
FIG. 13 is a schematic configuration diagram for explaining an embodiment of the magnetic bearing device of the prior art.
Figure 14:
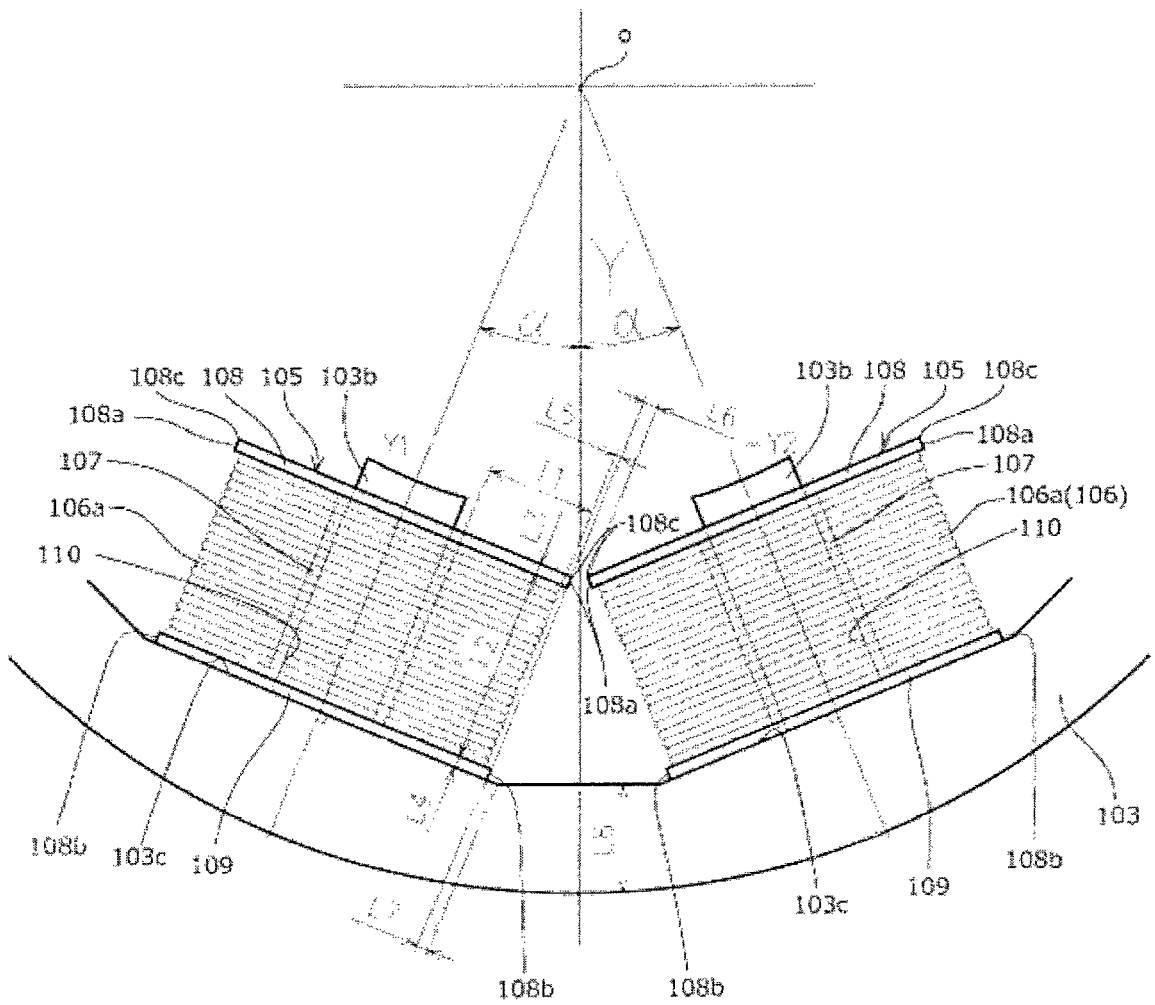
FIG. 14 is a partial enlarged view of FIG. 13.

FIGS. 8 to 12 each show a second modification of the annular stator core 31. FIGS. 8 and 9 correspond to the electromagnet −Y illustrated in FIGS. 3 and 4 and omit the illustration of the hatched section for the purpose of simplification. Also, FIGS. 10 to 12 each show the bobbins 33 of the annular stator core 31 of FIGS. 8 and 9. FIGS. 10A and 10B are a plan view taken along arrows A and B of FIG. 8. FIG. 11 is a schematic perspective view showing the bobbins 33 from the center of the annular stator core 31. FIG. 12 is a schematic perspective view showing the bobbins 33 from the outer periphery side of the annular stator core 31.

The second modification illustrated in FIGS. 8 to 12 is a modification that is further developed by combining the embodiment illustrated in FIGS. 2 to 4 and the first modification illustrated in FIGS. 5 to 7. Therefore, the same reference numerals are given to the parts corresponding to the annular stator core 31 illustrated in FIGS. 2 to 7, and redundant explanations are omitted accordingly. Thus, only the parts having different configurations are described. In addition, the electromagnet −Y1 and the electromagnet −Y2 illustrated in the second modification are symmetrical with respect to the a angle, and the parts of the electromagnet −Y1 and the parts of the electromagnet −Y2 share the same structure. Therefore, in FIGS. 8 and 9, the detailed reference numerals corresponding to the description are given only to the electromagnet −Y1, but for the electromagnet −Y2, reference numerals are given generically and omitted accordingly.

The electromagnet −Y illustrated in FIGS. 8 and 9 is a uniaxial electromagnet having the electromagnet −Y1 and the electromagnet −Y2. In the bobbin 33 attached to the tooth 31b of the electromagnet −Y1 and the bobbin 33 attached to the tooth 31b of the electromagnet −Y2, as illustrated in FIG. 8, circumferential end surfaces 36a, 36a1 of the first flange portion 36 and circumferential end surfaces 37a, 37a1 of the second flange portion 37 are chamfered to have widths L9, L91, L10, L17 that are inclined at chamfer angles β, β1, γ, γ1 and are provided with a plurality of recess portions 40a, 40b that function as notches for accommodating the portions 39a, 39b of these adjacent bobbins 33. The chamfers and the recess portions 40a, 40b function as the coil winding amount increasing means 30.

Therefore, in the annular electromagnet 21b illustrated in FIGS. 8 and 9, because the circumferential end surfaces 36a, 36a1 of the first flange portion 36 are chamfered so as to be inclined inward from outer edges 36b, 36b1 in the plate thickness direction of the first flange portion 36, the distance between the inner edges 36c, 36c1 of the first flange portions 36 of the adjacent bobbins 33 can be increased, contributing to increasing the amount of projection of the first flange portions 36. Note that FIGS. 11 and 12 each show the bobbins 33 that are provided with the chamfers and recess portions 40a, 40b formed on the circumferential end surfaces 36a, 36a1, 37a, 37a1 of the first flange portions 36 and the second flange portions 37. FIG. 11 is a schematic perspective view showing the bobbins from the center of the annular stator core 31, and FIG. 12 is a schematic perspective view showing the bobbins from the outer periphery of the annular stator core 31.

Therefore, in this modification as well, the interval L6 between the first flange portions 36 can be narrowed in such a manner that the amount of projection of the first flange portions 36 is increased so that the first flange portions 36 come close to each other, as illustrated in FIG. 9, from the state in which the first flange portions 36 of the adjacent bobbins 33 are separated from each other as illustrated in FIG. 8. Specifically, by increasing the amount of projection of the first flange portions 36 of the adjacent bobbins 33 so as to bring the outer edges 36b of the first flange portions 36 close to each other, the thickness of the coil wires 34a can be increased from L to L13, thereby making the number of turns of the coil wires 34a greater than the thickness L1 of the coil 34a.

$$L13=L+L15/2+L9 \times \tan 2\alpha/2 > L1$$

Furthermore, since the circumferential end surfaces 37a of the second flange portion 37 are chamfered so as to be inclined inward from the inner edge 37c in the direction of the plate thickness LA of the second flange portion 37, this chamfering functions as the coil winding amount increasing means 30, and these inclined chamfered surfaces dodge the curved shape (magnetic pole connecting part) of the inner peripheral wall 31a of the annular stator core 31, increasing the amount of circumferential projection of the second flange portions 37 of the bobbins 33 and the number of turns of the coil wires 34a. Moreover, the chamfer angle γ is set so that the magnetic pole connecting thickness L83 becomes greater than the magnetic pole connecting thickness L8 of the prior art (L83≥L8).

That is, L71≥L7+L15/2+L9×tan 2α/2 tan γ≤L10/(L7+L15/2+L9×tan 2α/2) are satisfied, where the chamfer angle γ can be set at L83≥L8.

In addition, since the recess portions 40b that function as the notches for accommodating the portions 39b of the bobbins 33 are provided in the bobbin 33 attached to the tooth 31b of the electromagnet −Y1 and the bobbin 33 attached to the tooth 31b of the electromagnet −Y2, the first flange portions 36 of these adjacent bobbins 33 do not interfere with each other at the time of assembly. Accordingly, the distance between the circumferential end surfaces (the amount of projection) of the first flange portions 36 of the bobbins 33 can be increased, and, with the resultant coil winding amount increasing means 30, the number of turns of the coil wires 34a can be increased and thereby the attractive force of the annular electromagnet 21b can be enhanced.

Figure 15:
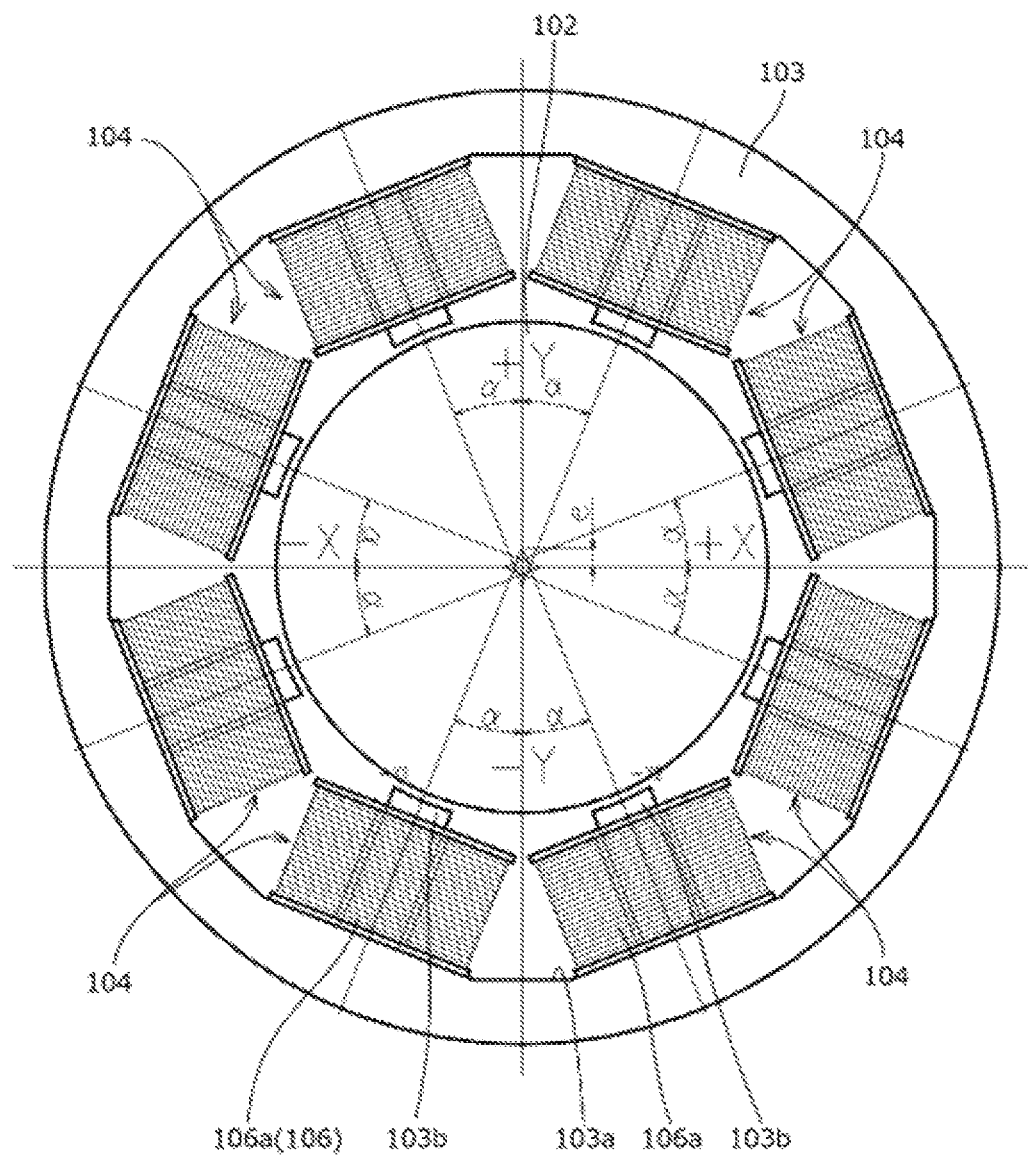
FIG. 15 is a schematic configuration diagram for explaining another embodiment of the magnetic bearing device of the prior art.
Figure 16:
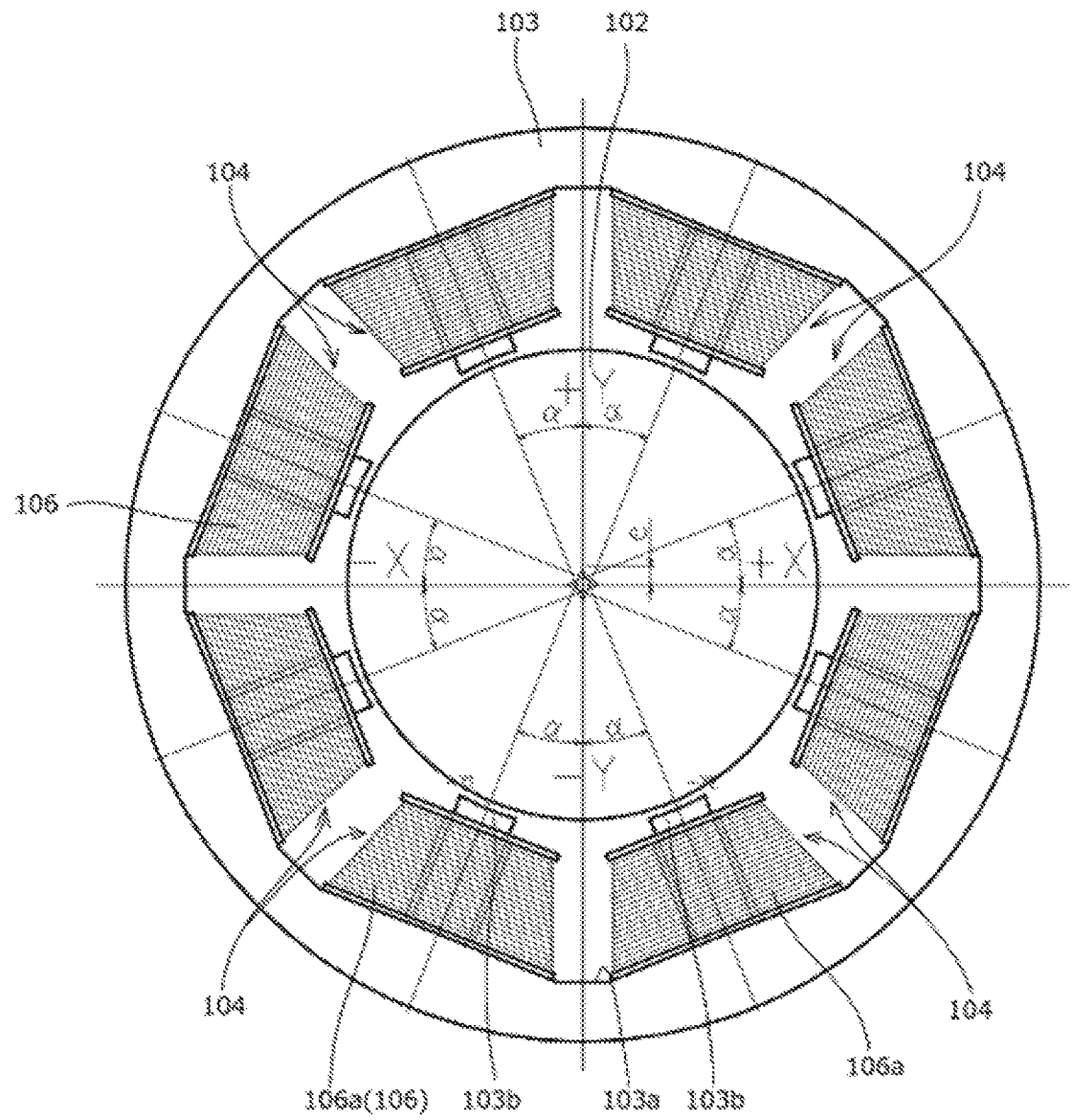
FIG. 16 is a schematic configuration diagram for explaining yet another embodiment of the magnetic bearing device of the prior art.

The present invention can also be applied to a bobbin of a coil having a rectangular winding or a trapezoidal winding with an offset illustrated in FIGS. 15 and 16. Various modifications can be made to the present invention without departing from the spirit of the present invention, and it goes without saying that the present invention extends to such modifications.

Although elements have been shown or described as separate embodiments above, portions of each embodiment may be combined with all or part of other embodiments described above.

Although the subject matter has been described in language specific to structural features and/or methodological acts, it is to be understood that the subject matter defined in the appended claims is not necessarily limited to the specific features or acts described above. Rather, the specific features and acts described above are described as example forms of implementing the claims.

What is claimed is:

1. A vacuum pump comprising:
a magnetic bearing device that is disposed radially outside of a rotor shaft and rotatably holds the rotor shaft, wherein
the magnetic bearing device has an annular stator core having, on an inner peripheral wall thereof, a plurality of teeth provided at predetermined intervals in a circumferential direction of the rotor shaft, and an annular electromagnet having a plurality of bobbins attached to the teeth respectively, the plurality of bobbins having coil wires wound around outer peripheries thereof,
the plurality of bobbins each having:
a rectangular cylindrical bobbin body that has the coil wire wound around the outer periphery thereof and is attached to each of the teeth;
a first flange portion provided on an end surface of the bobbin body so as to face the rotor shaft and formed into a rectangular hollow shape as viewed from the front;
a second flange portion provided on an end surface of the bobbin body so as to be opposite to the first flange portion and formed into a rectangular hollow shape as viewed from the front; and
coil winding amount increasing means formed at least on the first flange portion or the second flange portion and increasing the amount of winding of the coil wire wound around the bobbin body, wherein
the annular stator core is formed integrally,
the first flange portion of each of the plurality of bobbins adjacent to each other does not interfere with each other by the coil winding amount increasing means, and
the bobbin body can be inserted to the teeth from inside of the annular stator core.

2. The vacuum pump according to claim 1, wherein
the coil winding amount increasing means has, on circumferential end faces of the first flange portion, chamfers that are inclined inward from outer edges of the first flange portion in the plate thickness direction.

3. The vacuum pump according to claim 1, wherein
the coil winding amount increasing means has, on the circumferential end faces of two first flange portions of each of the plurality of bobbins adjacent to each other, notches that accommodate parts of the plurality of adjacent bobbins adjacent to each other.

4. The vacuum pump according to claim 1, wherein
the coil winding amount increasing means has, on circumferential end faces of the second flange portion, chamfers that are inclined inward from inner edges of the second flange portion in the plate thickness direction.

5. A magnetic bearing device comprising:
an annular stator core having, on an inner peripheral wall thereof, a plurality of teeth provided at predetermined intervals in a circumferential direction of the rotor shaft,
an annular electromagnet having a plurality of bobbins attached to the teeth respectively, the plurality of bobbins having coil wires wound around outer peripheries thereof,
the plurality of bobbins each having:
a rectangular cylindrical bobbin body that has the coil wire wound around the outer periphery thereof and is attached to each of the teeth;
a first flange portion provided on an end surface of the bobbin body so as to face the rotor shaft and formed into a rectangular hollow shape as viewed from the front;
a second flange portion provided on an end surface of the bobbin body so as to be opposite to the first flange portion and formed into a rectangular hollow shape as viewed from the front; and
coil winding amount increasing means formed at least on the first flange portion or the second flange portion and increasing the amount of winding of the coil wire wound around the bobbin body, wherein
the annular stator core is formed integrally,
the first flange portion of each of the plurality of bobbins adjacent to each other does not interfere with each other by the coil winding amount increasing means, and
the bobbin body can be inserted to the teeth from inside of the annular stator core.

6. An annular electromagnet comprising:
an annular stator core formed integrally and having a plurality of teeth, and
a plurality of bobbins attached to the teeth respectively, the plurality of bobbins having coil wires wound around outer peripheries thereof, the plurality of bobbins each having:
a rectangular cylindrical bobbin body that has the coil wire wound around the outer periphery thereof and is attached to each of the teeth;

a first flange portion provided on an end surface of the bobbin body so as to face the rotor shaft and formed into a rectangular hollow shape as viewed from the front;

a second flange portion provided on an end surface of the bobbin body so as to be opposite to the first flange portion and formed into a rectangular hollow shape as viewed from the front; and coil winding amount increasing means formed at least on the first flange portion or the second flange portion and increasing the amount of winding of the coil wire wound around the bobbin body, wherein the first flange portion of each of the plurality of bobbins adjacent to each other does not interfere with each other by the coil winding amount increasing means, and the bobbin body can be inserted to the teeth from inside of the annular stator core.

* * * * *